US010257731B2

United States Patent
Zeine et al.

(10) Patent No.: US 10,257,731 B2
(45) Date of Patent: Apr. 9, 2019

(54) SYSTEMS AND METHODS FOR DETERMINING OPERATIONAL STATUS OF FUNCTIONAL COMPONENTS OF A WIRELESS SIGNAL TRANSMISSION ENVIRONMENT

(71) Applicant: Ossia Inc., Bellevue, WA (US)

(72) Inventors: Hatem Ibrahim Zeine, Bellevue, WA (US); Ahmad Moghaddam, Kirkland, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

(21) Appl. No.: 15/948,111

(22) Filed: Apr. 9, 2018

(65) Prior Publication Data

US 2018/0338252 A1     Nov. 22, 2018

Related U.S. Application Data

(63) Continuation of application No. 15/599,877, filed on May 19, 2017, now Pat. No. 9,942,788.

(51) Int. Cl.
| | | |
|---|---|---|
| H04B 17/00 | (2015.01) | |
| H04W 24/08 | (2009.01) | |
| H04W 40/04 | (2009.01) | |
| H04W 40/24 | (2009.01) | |
| H04W 40/06 | (2009.01) | |
| H04W 76/25 | (2018.01) | |
| H04W 8/10 | (2009.01) | |
| G06T 7/00 | (2017.01) | |

(52) U.S. Cl.
CPC .............. *H04W 24/08* (2013.01); *G06T 7/001* (2013.01); *H04W 8/10* (2013.01); *H04W 40/04* (2013.01); *H04W 40/06* (2013.01); *H04W 40/246* (2013.01); *H04W 76/25* (2018.02); *G06T 2207/10048* (2013.01)

(58) Field of Classification Search
CPC ....... H04W 24/08; H04W 8/10; H04W 40/04; H04W 40/246; H04W 76/045
USPC ............. 455/422.1, 423, 67.11, 115.1, 226.1
See application file for complete search history.

(56) References Cited

U.S. PATENT DOCUMENTS

| | | |
|---|---|---|
| 6,697,617 B2 | 2/2004 | Liebenow |
| 8,103,316 B2 | 1/2012 | Chakraborty et al. |
| 8,159,364 B2 | 4/2012 | Zeine |
| 8,410,953 B2 | 4/2013 | Zeine |
| 8,446,248 B2 | 5/2013 | Zeine |
| 8,484,494 B2 | 7/2013 | Siegel et al. |

(Continued)

*Primary Examiner* — Sonny Trinh

(57) ABSTRACT

For determining operational status of components of a wireless signal transmission environment, a signal is received from a client power receiver (CPR), and at least one waveform characteristic value of the signal is calculated. Based on the determined waveform characteristic value(s), a current transceiver system operational status is computed for the CPR at a current location. The determined current transceiver system operational status is compared with a prior-stored last known good transceiver system operational status for the CPR at the current location, and it is determined if, as a result of the comparing, the current transceiver system operational status matches the prior-stored last known good transceiver system operational status for the CPR at the current location. Determining a presence or an absence of the match facilitates identifying one of a presence and an absence of: functional problem(s) in: at least one of the transceiver system and the CPR.

20 Claims, 16 Drawing Sheets

(56) References Cited

U.S. PATENT DOCUMENTS

| | | |
|---|---|---|
| 8,558,661 B2 | 10/2013 | Zeine |
| 8,854,176 B2 | 10/2014 | Zeine |
| 8,904,212 B2 | 12/2014 | Siegel et al. |
| 2008/0139120 A1 | 6/2008 | Chase |
| 2015/0042526 A1 | 2/2015 | Zeine |
| 2016/0033254 A1 | 2/2016 | Zeine et al. |
| 2016/0299549 A1 | 10/2016 | Zeine et al. |
| 2016/0300547 A1 | 10/2016 | El-Rukby et al. |
| 2017/0005531 A1 | 1/2017 | Zeine et al. |

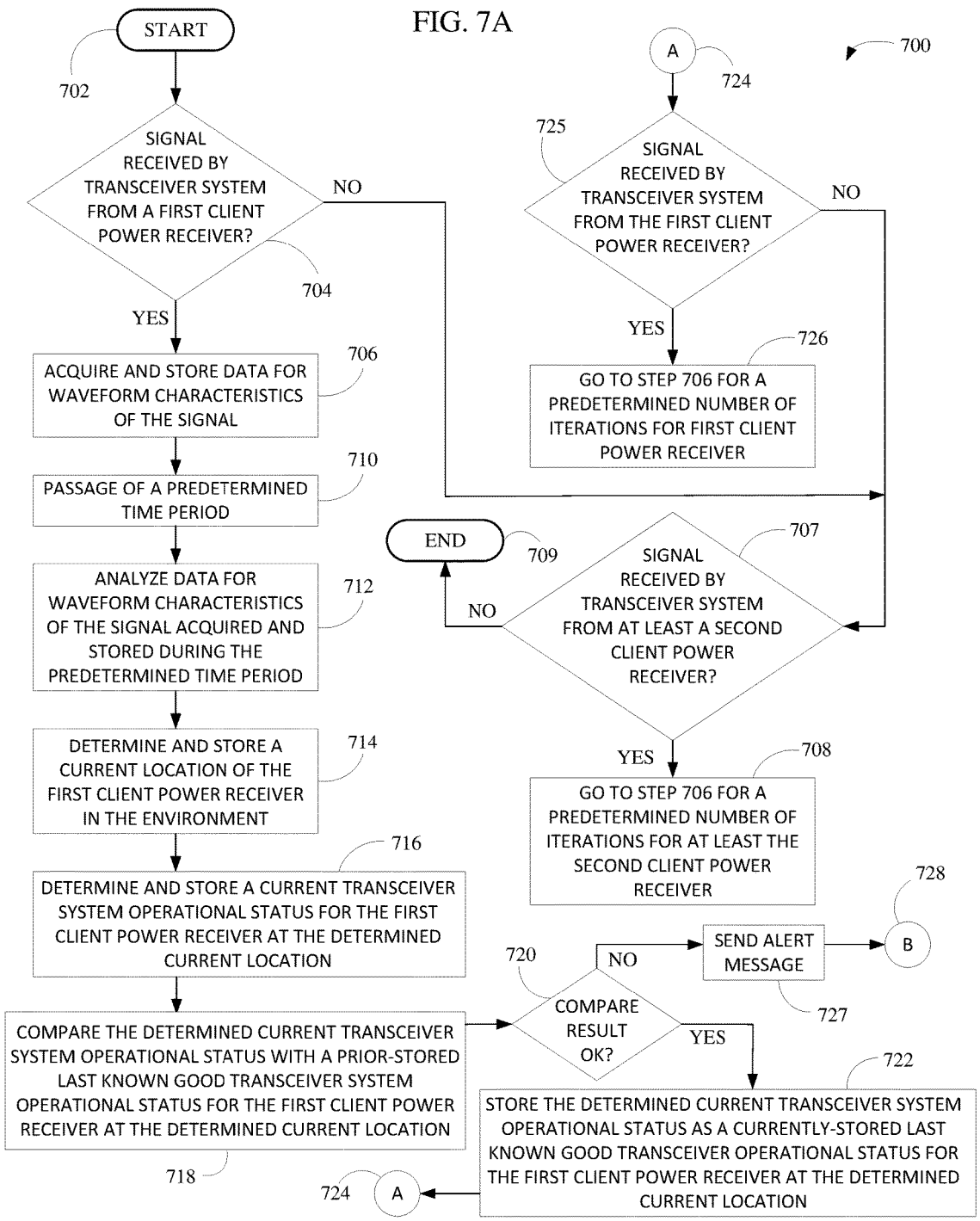

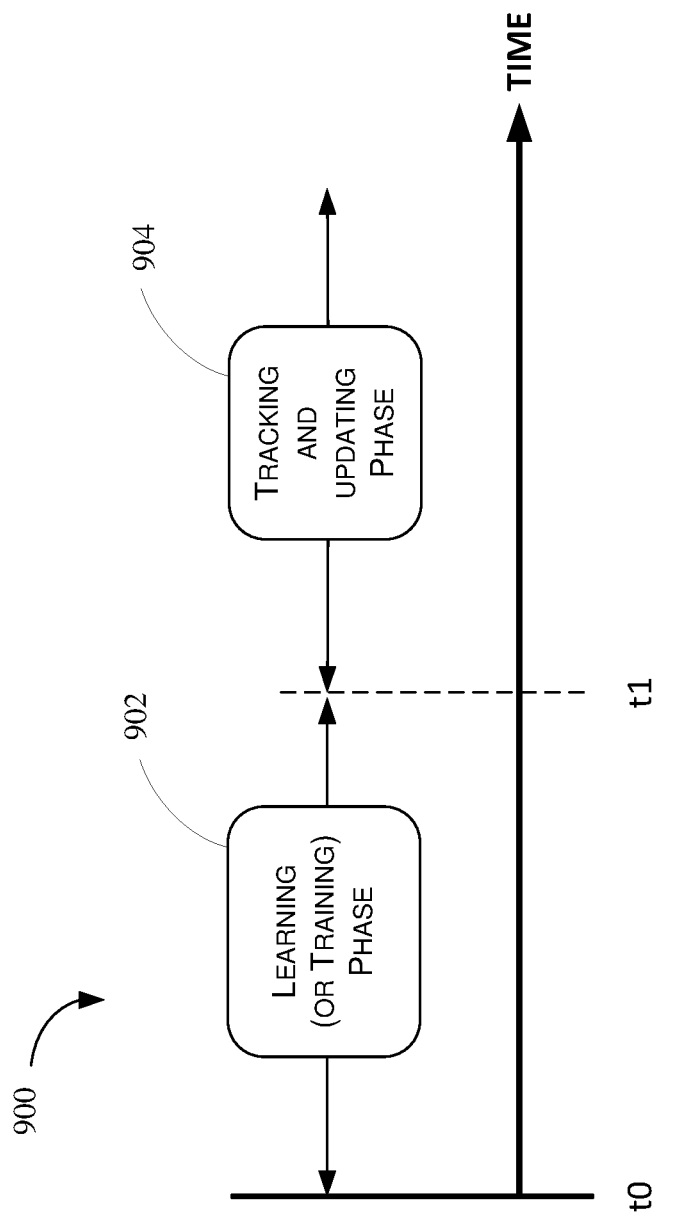

SYSTEMS AND METHODS FOR DETERMINING OPERATIONAL STATUS OF FUNCTIONAL COMPONENTS OF A WIRELESS SIGNAL TRANSMISSION ENVIRONMENT

CROSS-REFERENCE TO RELATED APPLICATION

This application is a continuation of U.S. patent application Ser. No. 15/599,877 titled "SYSTEMS AND METHODS FOR DETERMINING OPERATIONAL STATUS OF FUNCTIONAL COMPONENTS OF A WIRELESS SIGNAL TRANSMISSION ENVIRONMENT" filed on May 19, 2017, now allowed, which is expressly incorporated herein by reference.

BACKGROUND

Wireless communication and power transmission systems require functionality of both transmitters and receivers for continuous operation. Effective signal transmitting (Tx) and receiving (Rx) between such components may be limited to some degree by changes in a wireless environment that are caused by functional issues of associated transmitters, receivers, and other devices implementing signal Tx, Rx, and processing. A wireless environment may also include a variety of movable objects which block or diminish line-of-sight (LOS) signal paths between transmitters and receivers. Such dynamic changes in the environment are determinable by the wireless communication and power transmission system based on, for example, waveform characteristics of received signals. Waveform characteristics may also be altered due to functional issues occurring in signal Tx, Rx, and processing components. To restore full and continuous functionality in wireless communication and power transmission systems in as short of a time as possible, system identification of changes in waveforms, interruptions in signal Tx and Rx, and distinguishing between component functional issues and changes in non-functional aspects of the environment is required.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIGS. 7A, 7B, 7C, 7D, and 7E are data flow diagrams illustrating an example process for determining operational status of components of a wireless signal transmission environment, according to some embodiments.

FIG. 9 is a diagram illustrating an example timeline indicating phases of the techniques described herein for determining operational status of components of a wireless signal transmission environment, according to some embodiments.

SUMMARY

Figure 1:
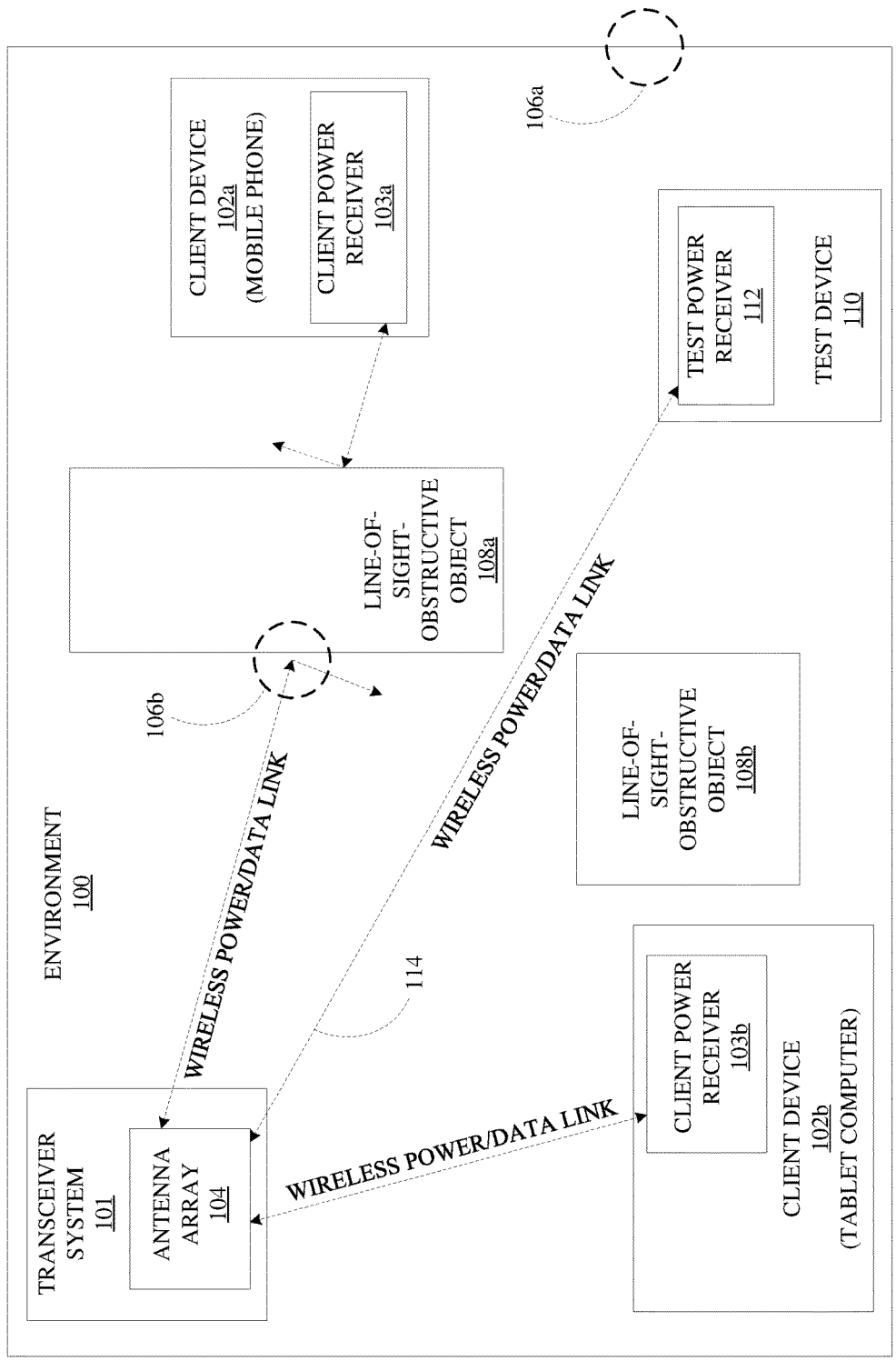
FIG. 1 is a diagram illustrating an example wireless communication and power delivery environment depicting wireless power delivery and data communication from one or more wireless transceiver systems to various wireless client devices within the environment, according to some embodiments.

In one embodiment, a method for determining operational status of components of a wireless signal transmission environment is provided. The components include a transceiver system wirelessly communicatively coupled to a client power receiver. The transceiver system includes an antenna array, a processor, and a memory. The transceiver system and the client power receiver are positioned in an environment. The method includes receiving, at a plurality of elements of the antenna array, a signal from the client power receiver. The method also includes calculating and storing, by the processor and in the memory, respectively, a value of at least one waveform characteristic of the received signal. The method further includes computing and storing, by the processor and in the memory, respectively, and based at least in part on the determined value of the at least one waveform characteristic for the client power receiver at a current location in the environment, a current transceiver system operational status for the client power receiver at the current location. The method also includes comparing, by the processor, the determined current transceiver system operational status with a prior-stored last known good transceiver system operational status for the client power receiver at the current location. The method further includes determining, by the processor, if, as a result of the comparing, the computed current transceiver system operational status is a match to the prior-stored last known good transceiver system operational status for the client power receiver at the current location. The determining one of a presence of the match and an absence of the match facilitates identifying, by the processor, one of a presence and an absence of: at least one functional problem in: at least one of the transceiver system and the client power receiver.

In other embodiments, the method also includes computing, by the processor, the current location of the client power receiver in the environment based at least in part on the determined value of the at least one waveform characteristic.

In still other embodiments, the method further includes storing, in the memory, the determined current transceiver system operational status as a currently-stored last known good transceiver system operational status for the client power receiver at the current location.

In some embodiments, the method also includes alerting, by the processor, a user of at least one of: the transceiver system and the client power receiver, if, as a result of the comparing, the determined current transceiver system operational status does not match the prior-stored last known good transceiver system operational status for the client power receiver at the current location.

In some other embodiments, the method further includes transmitting, by the processor, user instructions to a user of at least one of: the transceiver system and the client power receiver, if, as a result of the comparing, the determined current transceiver system operational status does not match the prior-stored last known good transceiver system operational status for the client power receiver at the current location, the user instructions specifying at least one troubleshooting-related action for the user to perform in the environment.

In still other embodiments, the method also includes performing, for at least one repetition after a first instance of the receiving and at predetermined intervals of time over a period of time beginning at the first instance: the receiving, the calculating and storing, the computing and storing, the comparing, the determining, and the identifying, where the performing facilitates tracking a plurality of historical operational statuses for the transceiver system, the tracking further facilitating the identifying.

In some other embodiments, the method further includes performing, at least one iteration of: the receiving, the calculating and storing, the computing and storing, the comparing, the determining, and the identifying, for each element of at least a subset of the plurality of elements, where the performing further facilitates the identifying.

In yet other embodiments, the method includes acquiring and storing, by the processor via the 3D scanner array, and in the memory, respectively, data representative of a physical layout of the environment. In such other embodiments, the method also includes determining and storing, by the processor and in the memory, respectively, a current model of the environment based at least in part on the data representative of the physical layout of the environment. In these embodiments, the method further includes comparing, by the processor, the determined current model of the environment with a prior-stored last known model of the environment associated with the prior-stored last known good transceiver system operational status for the client power receiver at the current location. In such embodiments, the method also includes determining, by the processor, if, as a result of the comparing of the determined current model with the prior-stored last known model, the determined current model is a match to the prior-stored last known model for the client power receiver at the current location, where the determining one of a presence of the match and an absence of the match between the determined current model and the prior-stored last known model further facilitates the identifying.

In those embodiments including the acquiring and storing, the environment includes at least one line-of-sight (LOS) obstructive object, and the method also includes determining, by the processor and based at least in part on the comparison of the determined current model with the prior-stored last known model, a change in a position of the at least one LOS obstructive object in the determined current model relative to the prior-stored last known model. In such embodiments, the method further includes ascertaining, by the processor and based at least in part on at least one of: the value of the at least one waveform characteristic, the current location, and the determined change in position, if the at least one LOS obstructive object is at least partially obscuring an LOS between the client power receiver and at least one element of the plurality of elements, where the ascertaining further facilitates the identifying.

In the embodiments including the determining the change in the position of the at least one LOS obstructive object, the method also includes transmitting, by the processor, a message to a user of at least one of: the transceiver system and the client power receiver, the message instructing the user to at least one of: verify the determined change in the position, verify whether or not the ascertained at least partial obscuration of the LOS is an actual obscuration of the LOS in the environment, and place the client power receiver in a new position that is fully in LOS with the at least one element. In these embodiments, the method further includes receiving a response to the message from the user, the response further facilitating the identifying.

In another embodiment, a system for determining operational status of components of a wireless signal transmission environment is provided. The system includes a transceiver system wirelessly communicatively coupled to a client power receiver, the transceiver system positioned in the environment with the transceiver system, the transceiver system including antenna array having a plurality of elements configured to receive a signal from the client power receiver. The system also includes at least one memory and at least one processor communicatively coupled to the antenna array and communicatively coupled to at least one memory. The at least one processor is programmed to direct the plurality of elements of the antenna array to receive the signal from the client power receiver. The at least one processor is also programmed to calculate and store in the at least one memory a value of at least one waveform characteristic of the received signal. The at least one processor is further programmed to compute and store in the memory, based at least in part on the determined value of the at least one waveform characteristic for the client power receiver at a current location in the environment, a current transceiver system operational status for the client power receiver at the current location. The at least one processor is also programmed to compare the determined current transceiver system operational status with a prior-stored last known good transceiver system operational status for the client power receiver at the current location. The at least one processor is further programmed to determine if, as a result of the comparing, the computed current transceiver system operational status is a match to the prior-stored last known good transceiver system operational status for the client power receiver at the current location. The at least one processor is also programmed to identify, based at least in part on determining one of a presence of the match and an absence of the match, one of a presence and an absence of: at least one functional problem in: at least one of the transceiver system and the client power receiver.

In other embodiments, the at least one processor of the system is further programmed to compute the current location of the client power receiver in the environment based at least in part on the determined value of the at least one waveform characteristic.

In still other embodiments, the at least one processor of the system is further programmed to store in the memory the determined current transceiver system operational status as a currently-stored last known good transceiver system operational status for the client power receiver at the current location.

In some embodiments, the at least one processor of the system is further programmed to alert a user of at least one of: the transceiver system and the client power receiver, if, as a result of the comparing, the determined current transceiver system operational status does not match the prior-stored last known good transceiver system operational status for the client power receiver at the current location.

In some other embodiments, the at least one processor of the system is further programmed to transmit user instructions to a user of at least one of: the transceiver system and the client power receiver, if, as a result of the comparing, the determined current transceiver system operational status does not match the prior-stored last known good transceiver system operational status for the client power receiver at the current location, the user instructions specifying at least one troubleshooting-related action for the user to perform in the environment.

In still other embodiments, the at least one processor of the system is further programmed to perform, for at least one repetition after a first instance of receiving the signal at the plurality of elements from the client power receiver, and at predetermined intervals of time over a period of time beginning at the first instance: the receiving, the calculating and storing, the computing and storing, the comparing, the determining, and the identifying. In such embodiments, the at least one processor is also programmed to track, based on performing the at least one repetition, a plurality of historical operational statuses for the transceiver system. In these embodiments, tracking the plurality of historical operational statuses further facilitates the identifying one of a presence and an absence of: the at least one functional problem in: the at least one of the transceiver system and the client power receiver.

In some other embodiments, the at least one processor of the system is further programmed to perform at least one iteration of: the receiving, the calculating and storing, the computing and storing, the comparing, the determining, and the identifying, for each element of at least a subset of the plurality of elements, where the performing further facilitates the identifying one of a presence and an absence of: the at least one functional problem in: the at least one of the transceiver system and the client power receiver.

In still other embodiments, the transceiver system further includes a three-dimensional (3D) array scanner, and the at least one processor of the system is further programmed to acquire and store in the memory via the 3D scanner array, data representative of a physical layout of the environment. In such other embodiments, the at least one processor is also programmed to determine and store in the memory, a current model of the environment based at least in part on the data representative of the physical layout of the environment. In these embodiments, the at least one processor is further programmed to compare the determined current model of the environment with a prior-stored last known model of the environment associated with the prior-stored last known good transceiver system operational status for the client power receiver at the current location. In such embodiments, the at least one processor is also programmed to determine if, as a result of the comparing of the determined current model with the prior-stored last known model, the determined current model is a match to the prior-stored last known model for the client power receiver at the current location, where the determining one of a presence of the match and an absence of the match between the determined current model and the prior-stored last known model facilitates the identifying one of a presence and an absence of: the at least one functional problem in: the at least one of the transceiver system and the client power receiver.

In those embodiments including the at least one processor programmed to acquire and store, the environment includes at least one LOS obstructive object, the at least one processor is further programmed to determine, and based at least in part on the comparison of the determined current model with the prior-stored last known model, a change in a position of the at least one LOS obstructive object in the determined current model relative to the prior-stored last known model. In such embodiments, the at least one processor is also programmed to ascertain, based at least in part on at least one of: the value of the at least one waveform characteristic, the current location, and the determined change in position, if the at least one LOS obstructive object is at least partially obscuring an LOS between the client power receiver and at least one element of the plurality of elements, where ascertaining if the at least one LOS obstructive object is at least partially obscuring the LOS further facilitates the identifying one of a presence and an absence of: the at least one functional problem in: the at least one of the transceiver system and the client power receiver.

In the embodiments including the at least one processor programmed to determine the change in the position of the at least one LOS obstructive object, the at least one processor is further programmed to transmit a message to a user of at least one of: the transceiver system and the client power receiver, the message instructing the user to at least one of: verify the determined change in the position, verify whether or not the ascertained at least partial obscuration of the LOS is an actual obscuration of the LOS in the environment, and place the client power receiver in a new position that is fully in LOS with the at least one element. In these embodiments, the at least one processor is also programmed to direct receipt of a response to the message from the user, the response further facilitating the identifying one of a presence and an absence of: the at least one functional problem in: the at least one of the transceiver system and the client power receiver.

In a further embodiment, one or more non-transitory computer-readable media (CRM) are provided. The one or more CRM have stored thereon processor-executable program instructions. When executed by at least one processor communicatively coupled to at least one memory and communicatively coupled to an antenna array of a transceiver system positioned in an environment with a client power receiver, the program instructions cause the at least one processor to direct a plurality of elements of the antenna array to receive a signal from the client power receiver. When executed by the at least one processor, the program instructions also cause the processor to calculate and store in the at least one memory a value of at least one waveform characteristic of the received signal. When executed by the processor, the program instructions further cause the at least one processor to compute and store in the memory, based at least in part on the determined value of the at least one waveform characteristic for the client receiver at a current location in the environment, a current transceiver system operational status for the client power receiver at the current location. When executed by the processor, the program instructions also cause the at least one processor to compare the determined current transceiver system operational status with a prior-stored last known good transceiver system operational status for the client power receiver at the current location. When executed by the processor, the program instructions further cause the at least one processor to determine if, as a result of the comparing, the computed current transceiver system operational status is a match to the prior-stored last known good transceiver system operational status for the client power receiver at the current location. And, when executed by the at least one processor, the program instructions further also cause the at least one processor to identify, based at least in part on determining one of a presence of the match and an absence of the match, one of a presence and an absence of: at least one functional problem in: at least one of the transceiver system and the client power receiver.

DETAILED DESCRIPTION

Techniques are described herein for determining operational status of components of a wireless signal transmission environment. More specifically, embodiments of the present disclosure describe techniques for identifying a functional problem in one or more of the wireless signal components based on comparing the current operational component determined operational status with prior-stored operational statuses. Additionally, the techniques describe methods and systems for providing operational status determinations that are specific for respective wireless communication and/or wireless power transmission system client devices at corresponding locations in the environment.

In some embodiments, the systems and methods described herein can provide wireless communication and/or wireless power transmission system users with alerts and/or messages to facilitate identifying a functional problem and to direct the user to perform system diagnostics or troubleshooting-related actions in the environment. More specifically, the diagnostic techniques include systems and methods for determining operational status of components of a wireless signal transmission environment integrate remote (e.g., cloud-based networks) processing and data storage to track historical operational statuses, and further to utilize model data of the environment to facilitate identifying whether or not a functional problem exists in one or more of the components.

In some implementations, the disclosed technology has one or more benefits. One benefit to determining operational status of components of a wireless signal transmission environment according to the methods and systems described herein is tracking historical operational statuses to facilitate not only identifying, but also predicting occurrences of function problems in the wireless communication and/or wireless power transmission system. Another benefit is reducing service interruption and enabling faster and less costly methods for returning such systems to full functionality after a problem occurs, thereby improving the percentage of time that such systems are online and fully functional for the benefit of users. Other benefits will become apparent to those having ordinary skill in the art based on this disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but are not necessarily, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms can be highlighted (e.g., using italics and/or quotation marks). The use of highlighting has no influence on the scope and meaning of a term; the scope and meaning of a term is the same, in the same context, whether or not it is highlighted. It will be appreciated that the same thing can be said in more than one way.

Consequently, alternative language and synonyms can be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles can be used in the examples for convenience of the reader, and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various implementations of the disclosed technology are described below. The following description provides specific details and an enabling description of these implementations.

FIG. 1 is a diagram illustrating an example wireless communication/power delivery environment 100 depicting wireless power delivery and data communication from one or more wireless transceiver systems 101 to various wireless client devices 102 within environment 100. In particular, FIG. 1 illustrates an example wireless communication and power delivery environment 100 in which wireless power and/or data can be delivered to available wireless client devices 102 having one or more client power receivers 103. The client power receivers 103 are integrated into respective client devices 102 and are configured to receive wireless power from the one or more transceiver systems 101. Within environment 100, the wireless delivery of power from transceiver system 101 to client power receivers 103 in client device 102 is also referred to herein as a wireless power transfer system (WPTS).

As shown in the example of FIG. 1, the wireless client devices 102 shown in FIG. 1 are mobile phone devices (e.g., a first client device 102a having a respective first client power receiver 103a) and a tablet computer (e.g., a second client device 102b having a respective second client power receiver 103b), although the client devices 102 can be any wireless device that needs power and is capable of receiving wireless power via one or more integrated client power receivers 103. The client devices 102 shown in FIG. 1 are enabled to communicate with transceiver systems 101 and other communication devices (e.g., WiFi and cellular networks). Client devices 102 are further enabled to transmit beacon signals. Other client devices, not shown in FIG. 1, are not configured nor enabled to communicate (e.g., no Bluetooth or WiFi capability) and thus do not transmit beacon signals. As discussed herein, the one or more integrated power receiver clients, or "wireless power receivers," receive and process power from the one or more transceiver systems 101 and provide the power to the client devices 102 for operation thereof.

Each transceiver system 101 includes an antenna array 104 having a plurality of antenna elements that are each capable of delivering wireless power to client devices 102. Each transceiver system 101 can also transmit (Tx) and receive (Rx) wireless data communication signals to and from client devices 102, respectively. In some embodiments, the data communication antennas can communicate via Bluetooth™, WiFi, ZigBee™, or other wireless communication protocols such IEEE 802.15.4 or IEEE 802.11. Also, in some embodiments, the wireless power and wireless communication signals can be delivered as a combined power/communication signal. In still other embodiments, not shown in FIG. 1, transceiver system 101 includes an additional antenna and/or an antenna array separate from antenna array 104 that implements data communication, but not wireless power delivery. The transceiver system 101 is configured to determine the appropriate phases to transmit coherent power signals to the client power receivers 103 as part of the WPTS. Antenna array 104 thus transmits a signal (e.g., a continuous wave or a pulsed power transmission signal) from each of the plurality of antenna elements at a specific phase relative to each other. Further, it is to be understood that use of the term "array" does not necessarily limit the antenna array 104 to any specific array structure. That is, the antenna array 104 need not be structured in a specific "array" form or geometry. Furthermore, as used herein, the term "array" or "array system" can be used to include related and peripheral circuitry for signal generation, reception, and transmission, such as in radios, digital logic, and modems.

Each client power receivers 103 includes one or more antennas (not shown) for receiving signals from the transceiver systems 101. Antenna array 104 is capable of emitting continuous wave signals at specific phases relative to each other. As discussed above, using antenna array 104 as a primary input device, transceiver system 101 is capable of determining the appropriate phases for delivering coherent signals to the client power receivers 103. For example, coherent signals can be determined by computing the complex conjugate of a received beacon and/or other signal at each antenna element of antenna array 104 such that the coherent signal is properly phased for the particular client power receiver 103 that transmitted the beacon or other signal. The beacon signal and other signals described and illustrated, are primarily referred to herein as continuous waveforms, but alternatively or additionally take the form of modulated signal waveforms.

Although not illustrated in FIG. 1, each of the above listed components of the environment 100 (e.g., client power receivers 103, transceiver system 101, etc.) can include control and synchronization mechanisms, such as a data communication synchronization module. The transceiver systems 101 are connected to a power source such as, for example, a power outlet or source connecting the transmitters to a standard or primary alternating current (AC) power supply in a building. Alternatively, or additionally, one or more of the transceiver systems 101 can be powered by a battery or via another power-providing mechanism.

In some embodiments, the client power receivers 103 and/or the transceiver systems 101 utilize or encounter reflective surfaces 106 such as, for example, walls or other RF reflective obstructions within range to beacon and deliver and/or receive wireless power and/or data within wireless communication and power delivery environment 100. In the embodiment shown in FIG. 1, for example, a first reflective surface 106a is a wall of a room in a structure such as a house. A second reflective surface 106b other than a structural aspect of the room is also shown in FIG. 1 as a first line-of-site (LOS) obstructive object 108a such as a piece of furniture (e.g., a sofa). First client power receiver 103a is not in the LOS of transceiver system 101 in this example due to the presence of first LOS obstructive object 108a. Environment 100 (e.g., room) also includes one or more other LOS obstructive objects (e.g., a second LOS obstructive object 108b embodied in a chair. As shown in FIG. 1, a second client power receiver 103b is not "blocked" from direct LOS Tx and Rx with transceiver system 101 by second LOS obstructive object 108b. Although one or more of the reflective surfaces 106 can be utilized for multi-directional signal Tx/Rx and power delivery regardless of whether a blocking object is in the LOS between transceiver system 101 and a client power receiver 103, under certain circumstances, LOS signal Tx/Rx and power delivery is desired to have a minimum Tx/Rx path length (e.g., effective range between transceiver system 101 and a respective client power receiver 103 in environment 100) as compared to a longer Tx/Rx path when using one or more reflective surfaces 106.

Also, in the example shown in FIG. 1, wireless communication and power delivery environment 100 includes at least one test device 110 having a respective test power receiver 112. As further described with reference to FIGS. 4 and 8, test power receiver 112 is positioned in environment 100 such that it is consistently in LOS of transceiver system 101 despite any changes in environment 100 such as movement of people and/or LOS obstructive objects. One such location to position test device 110 having test power receiver 112 is on a ceiling of the same room in which transceiver system 101 is also positioned in (e.g., also on the ceiling). Further, in the example shown in FIG. 1, one test device 110 is positioned in environment 100 at substantially a maximum practical distance 114 (e.g., range for LOS Tx/Rx and power delivery signal path) from transceiver system 101 (e.g., at an opposite corner of the room from a corner where transceiver system 101 is positioned).

As described herein, each client device 102 can be any system and/or device, and/or any combination of devices/systems that can establish a communication connection (e.g., session) with another device, a server and/or other systems within the example environment 100. In some embodiments, the client devices 102 include displays or other output functionalities to present data to a user and/or input functionalities to receive data from the user. By way of example, a client device 102 can be, but is not limited to, a video game controller, a server desktop, a desktop computer, a computer cluster, or a mobile computing device (such as a notebook, a laptop computer, a handheld or tablet computer, a mobile phone, a smart phone, a battery or component coupled to a battery, a PDA, etc.). The client device 102 can also be any wearable device such as watches, necklaces, rings, or even devices (e.g., medical or veterinary devices) implanted within a human or animal patient. Other examples of a client device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transceiver system 101 and the client power receivers 103 can each include a data communication module for communication via a data channel. Alternatively, or additionally, client power receivers 103 can direct client devices 102 to communicate with the transceiver system 101 via existing data communications modules.

Figure 2:
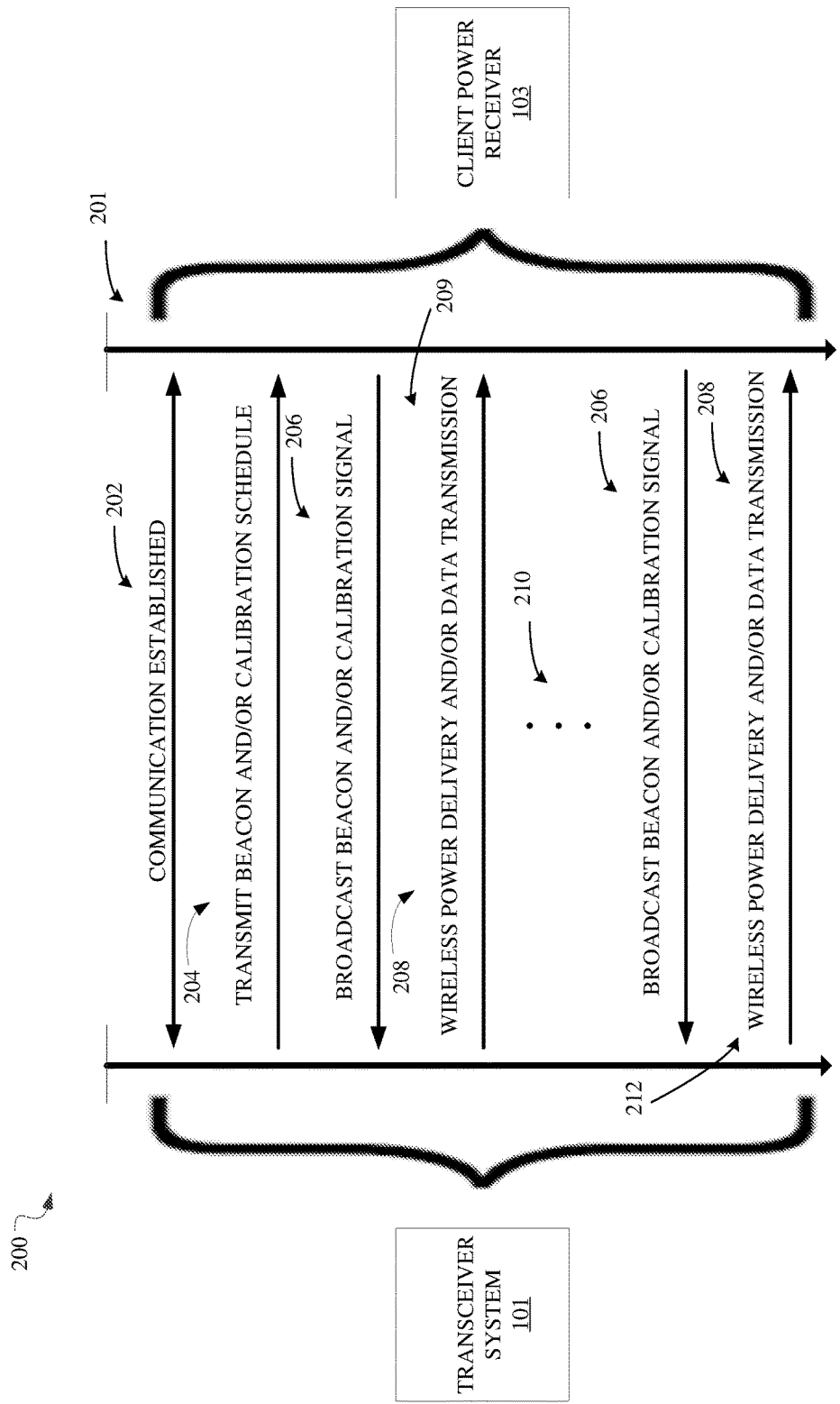
FIG. 2 is a sequence diagram illustrating example operations between the transceiver system and the client power receiver for commencing wireless power delivery and/or wireless data communication, according to some embodiments.

FIG. 2 is a sequence diagram 200 illustrating example operations (e.g., operations 202-208) between the transceiver system 101 and the client power receiver 103 for commencing wireless power delivery and/or wireless data communication, according to an embodiment. In FIG. 2, downwardly-facing arrows proximate transceiver system 101 and client power receiver 103 represent the passage of time and the ordering of operations in sequence diagram 200. Thus, in an operation 202 at an initial time point 201, communication is established between the transceiver system 101 and the client power receiver 103, such as communication via Bluetooth™, WiFi, ZigBee™, or other wireless communication protocols. In an operation 204 after communication is established, transceiver system 101 transmits a beaconing schedule to the client power receiver 103 to arrange beacon broadcasting and RF power/data communication schedules with client power receiver 103. Also, in operation 204, transceiver system 101 transmits a calibration schedule to client power receiver 103 after communication is established.

In an operation 206 and in response to the beaconing schedule and/or calibration schedule, the client power receiver 103 broadcasts the beacon and/or a calibration signal. The beacon received by antenna array 104 (not shown) of transceiver system 101 is used by transceiver system 101 to determine the phase (or direction) at which the beacon and/or calibration signal was received, and thereby to determine a location of the respective client power receiver 103 in environment 100 (not shown in FIG. 2). The transceiver system 101 then performs an operation 208 to deliver wireless power and/or transmits data to the client power receiver 103 based on the phase (or direction) of the received beacon. That is, the transceiver system 101 determines the complex conjugate of the phase and uses the complex conjugate to deliver power to the client power receiver 103 in the same LOS or non-line-of-sight (NLOS) direction in which the beacon signal was received from the client power receiver 103.

The above described operations 206 and 208 may be repeated at any time after a first instance 209 of operation 208. If needed, operations 202 and/or 204 are also repeated after the first instance 209 of operation 208. Operations 206 and 208, and optionally operations 202 and/or 204, are repeated in response to an event occurring as determined by at least one of the transceiver system 101 and the client power receiver 103. If, for example, and without limitation, at a subsequent time point 210 after the first instance 209 of operation 208, client power receiver 103 is relocated from a first position in wireless communication and power delivery environment 100 (shown in FIG. 1) to a second position therein, such a motion event is determined by at least one of the transceiver system 101 and the client power receiver 103. The motion event prompts the repetition of operations 206 and 208, and, if needed, operations 202 and/or 204. On the other hand, if, at subsequent time point 210, such a motion event is not determined by transceiver system 101 and/or client power receiver 103, neither operations 206 and 208, nor operations 202 and/or 204 require repetition. Similarly, if, after a second instance 212 of operation 208, client power receiver 103 is relocated from the first position in environment 100 to a second position therein, transceiver system 101 and/or client power receiver 103 determines this to be a subsequent motion event. Such a subsequent motion event causes operations 206 and 208, and, if needed, operations 202 and/or 204 to again be repeated in sequence diagram 200.

The transceiver system 101 can determine the different phases of the beacon signal received at each antenna element of antenna array 104. Transceiver system 101 can then utilize the algorithm or process described in one or more of U.S. Pat. Nos. 8,558,661, 8,159,364, 8,410,953, 8,446,248, and 8,854,176, U.S. patent application Ser. Nos. 14/461,332 and 14/815,893, and U.S. Provisional Patent Application Nos. 62/146,233 and 62/163,964, which are incorporated herein by reference in their entireties for all purposes. Taking into account the determined phases and the geometry of relative positions of each antenna element of the plurality of antenna elements in antenna array 104, transceiver system 101 determines how to emit signals from one or more antenna elements in such a way as to create an aggregate signal from the transceiver system 101 that approximately recreates the waveform and radiation pattern of the beacon, but in the opposite (e.g., reciprocal) direction.

Figure 3:
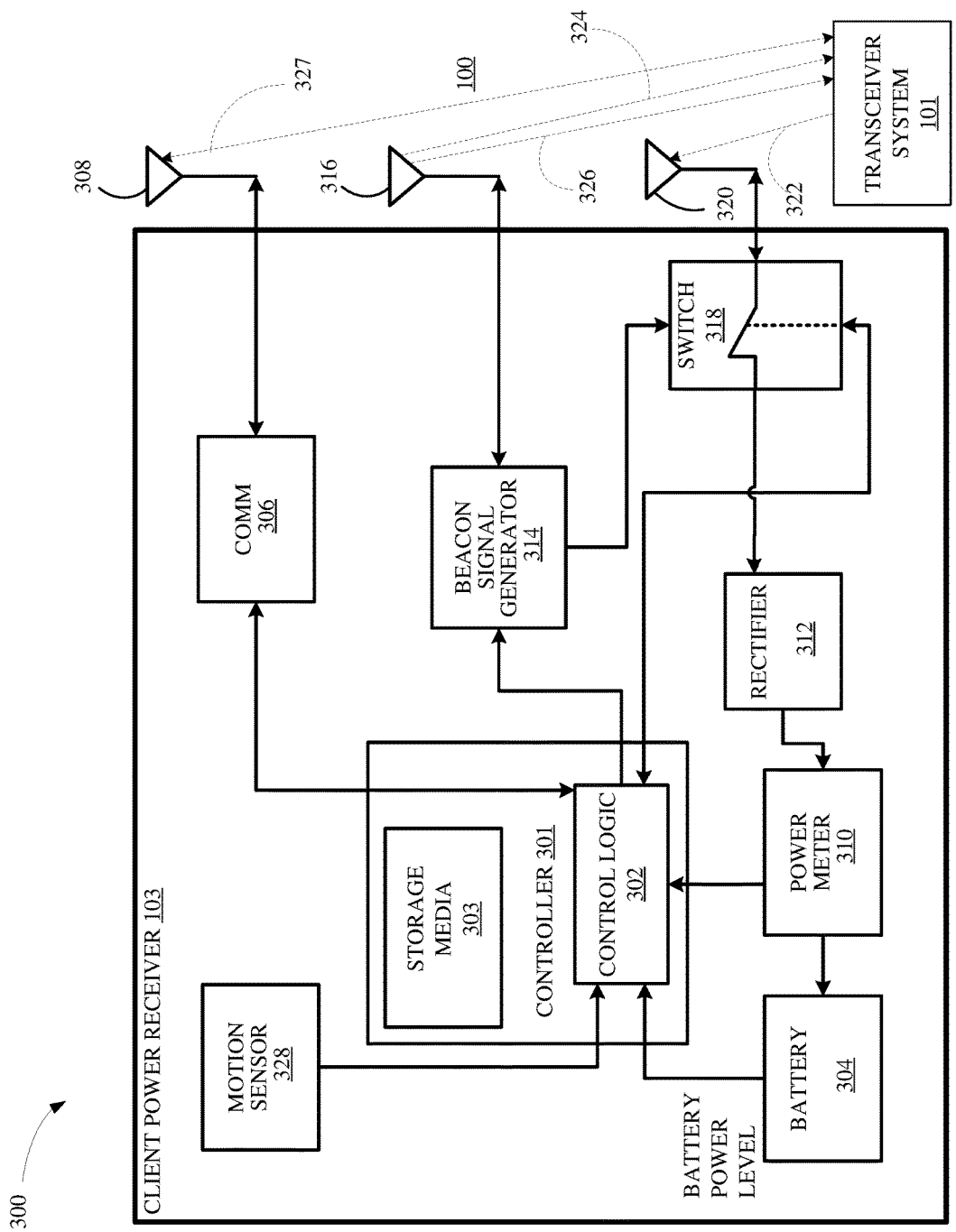
FIG. 3 is a block diagram illustrating an example client power receiver, according to some embodiments.

FIG. 3 is a block diagram illustrating an example client power receiver 300 in accordance with an embodiment (e.g., client power receiver 103*a* and/or 103*b* shown in FIGS. 1 and 2). The client power receiver 103 includes various functional components such as analog and digital electronic devices that are at least one of electrically and communicatively coupled together. The functional components of client power receiver 103 include a controller 301 having control logic 302 and data storage media 303. Client power receiver 103 also includes a battery 304, a communication block 306 and an associated first antenna 308, a power meter 310, a rectifier 312, a beacon signal generator 314 and an associated second antenna 316, and a switch 318 alternately coupling the rectifier 312 and the beacon signal generator 314 to an associated third antenna 320. Some or all of the above listed components of client power receiver 103 can be omitted in some embodiments. Additional or fewer components are also possible.

The rectifier 312 receives (e.g., via the third antenna 320) a power transmission signal 322 from the transceiver system 101, which is fed through the power meter 310 to the battery 304 for charging. The power meter 310 measures the total received power signal strength and provides the control logic 302 with this measurement. The control logic 302 can also receive the battery power level from the battery 304 itself or receive battery power level data from, for example, an application programming interface (API) of an operating system running on the client power receiver 103. The control logic 302 can also transmit/receive, via the communication block 306, a data signal on a data carrier frequency, such as the base signal clock for clock synchronization.

Using the second 316 and/or third 320 antennas, the beacon signal generator 314 transmits a beacon signal 324 or a calibration signal 326 to transceiver system 101. Furthermore, in the example embodiment, battery 304, and the first 308, second 316, and third 320 antennas are positioned in the client device 102 (not shown in FIG. 3). In other embodiments, at least one of the battery 304, and the first 308, second 316, and third 320 antennas are positioned in the client power receiver 103. For example, and without limitation, an embodiment of client power receiver 103, not shown in FIG. 3, includes a dedicated power supply such as a battery cell that may or may not be rechargeable through rectifier 312 and/or a plug-in charger circuit of the client device 102. Thus, in such other embodiments, during such times when client device 102 is powered off, client power receiver 103 may remain fully capable of using the second 316 and/or third 320 antennas to transmit beacon signal 324 and/or calibration signal 326, as well as receive power transmission signal 322, for purposes of client device 102 localization and/or WPTS-based battery 304 charging. At least one of the first 308, second 316, and third 320 antennas also enable client power receiver 103 to Tx/Rx a data signal 327 to/from transceiver system 101.

Although the battery 304 shown in FIG. 3 is charged via WPTS through the circuit including rectifier 312, the client power receiver 103 can also receive its supply power directly from the rectifier 312 instead of, or in addition to client power receiver 103 being powered by battery 304. Moreover, battery 304 is also the main power supply for client device 102 in the example embodiment, but is shown as included in the client power receiver 103 because of the integrated design characteristics of client power receiver 103 in client device 102. Also, it can be noted that the use of multiple antennas (e.g., antennas 308, 316, and 320) is one example of implementation of client power receiver 103 and the client power receiver 103 architecture structure can be reduced to one shared antenna, where the client power receiver 103 multiplexes signal reception and transmission.

Client power receiver 103 also includes a motion sensor 328 capable of detecting motion and signaling the control logic 302 of a motion event of client power receiver 103. For example, when client power receiver 103 is receiving power at high frequencies (e.g., above 500 MHz), its location can become a sink for incoming radiation. When a client power receiver 103 is in such an operational state and is on a person, the level of radiation can exceed acceptable radiation levels set by regulatory authorities. To avoid potential over-radiation issues, client power receiver 103 can integrate additional motion detection mechanisms (not shown in FIG. 3) such as accelerometers, assisted global positioning system (GPS), or other mechanisms. Once motion sensor 328 determines the motion event, control logic 302 assumes that the motion event equates to the client power receiver 103 being handled by a user of client device 102 (not shown in FIG. 3). Control logic 302 then signals the transceiver system 101 either to stop transmitting power to it, or to lower a transmitted power to an acceptable fractional level. In cases where the client power receiver 103 is used in a moving environment like a transceiver system 101-equipped vehicle (not shown in FIG. 3), power may be transmitted intermittently or at a reduced level until the device is close to losing all available power. Motion sensor 328, as well as the aforementioned additional motion detection mechanisms, may be integrated into client device 102 instead of or in addition to, and for the same functional effect and benefit as, being integrated into client power receiver 103.

Figure 4:
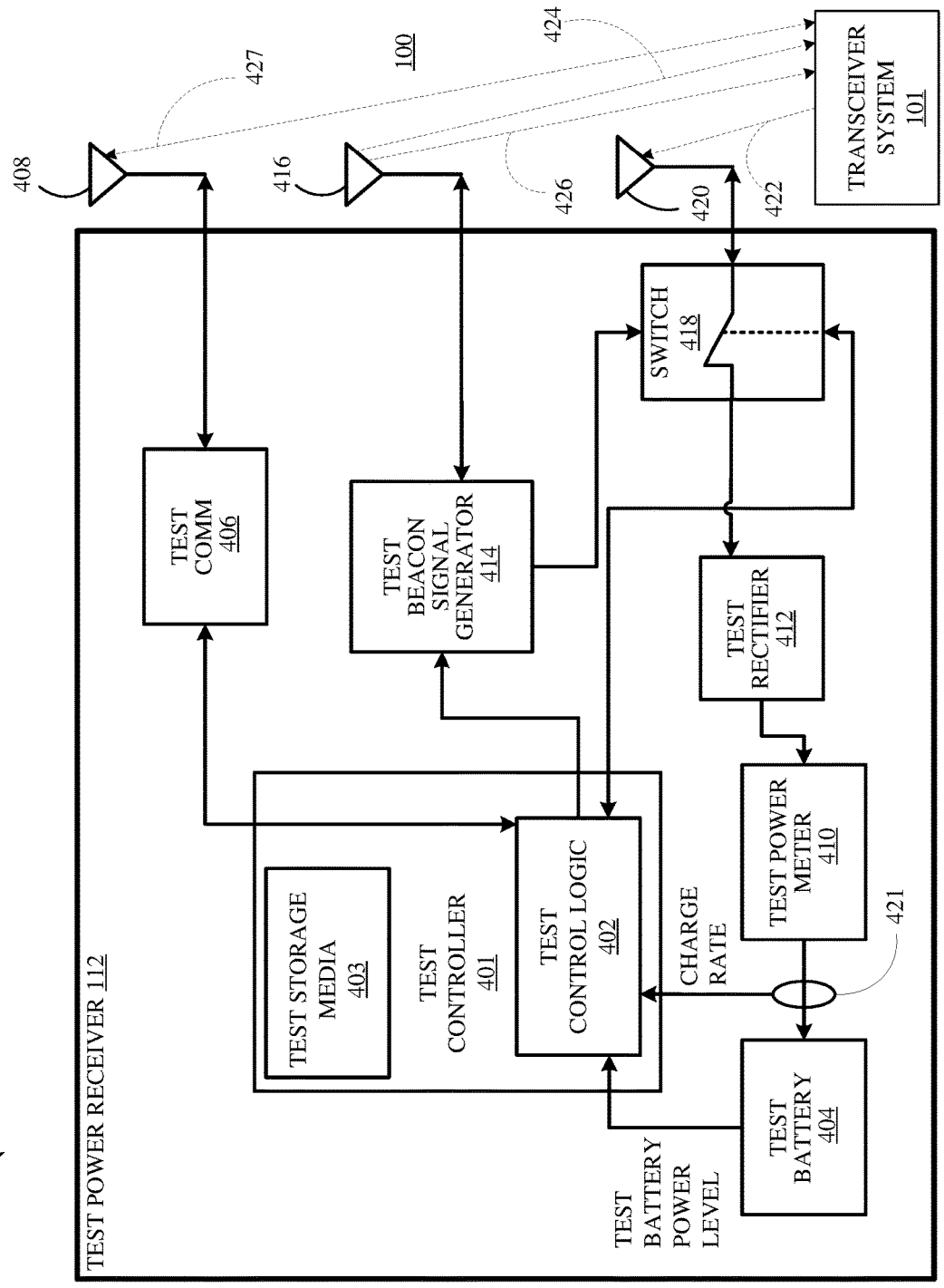
FIG. 4 is a block diagram illustrating an example test power receiver, according to some embodiments.

FIG. 4 is a block diagram illustrating an example test power receiver 400 in accordance with an embodiment (e.g., test power receiver 112 shown in FIG. 1). The test power receiver 112 includes various functional components such as analog and digital electronic devices that are at least one of electrically and communicatively coupled together. The functional components of test power receiver 112 include a test controller 401 having test control logic 402 and test data storage media 403. Test power receiver 112 also includes a test battery 404, a test communication block 406 and an associated first test antenna 408, a test power meter 410, a test rectifier 412, a test beacon signal generator 414 and an associated second test antenna 416, and a switch 418 alternately coupling the test rectifier 412 and the test beacon signal generator 414 to an associated third test antenna 420. Test power receiver 112 further includes a charge rate instrument 421 coupled to test battery 404. Some or all of the above listed components of test power receiver 112 can be omitted in some embodiments. Additional or fewer components are also possible.

The test rectifier 412 receives (e.g., via the third test antenna 420) a test power transmission signal 422 from the transceiver system 101, which is fed through the test power meter 410 to the test battery 404 for charging. The test power meter 410 measures the total received power signal strength and provides the test control logic 402 with this measurement. The test control logic 402 also can receive the battery power level from the test battery 404 itself or receive battery power level data from, for example, an application programming interface (API) of an operating system running on the test power receiver 112. The test control logic 402 can also transmit/receive, via the test communication block 406, a data signal on a data carrier frequency, such as the base signal clock for clock synchronization.

Using the second 416 and/or third 420 test antennas, the test beacon signal generator 414 transmits a test beacon signal 424 or a test calibration signal 426 to transceiver system 101. Furthermore, in the example embodiment, test battery 404, and the first 408, second 416, and third 420 test antennas are positioned in the test device 110 (not shown in FIG. 4). In other embodiments, at least one of the test battery 404, and the first 408, second 416, and third 420 test antennas are positioned in the test power receiver 112. For example, and without limitation, an embodiment of test power receiver 112, not shown in FIG. 4, includes a dedicated power supply such as a battery cell that may or may not be rechargeable through test rectifier 412 and/or a plug-in charger circuit of the test device 110. Thus, in such other embodiments, during such times when test device 110 is powered off, test power receiver 112 may remain fully capable of using the second 416 and/or third 420 antennas to transmit test beacon signal 424 and/or test calibration signal 426, as well as receive test power transmission signal 422, for purposes of test device 110 localization and/or WPTS-based test battery 404 charging. At least one of the first 408, second 416, and third 420 antennas also enable test power receiver 112 to Tx/Rx a test data signal 427 to/from transceiver system 101.

Although the test battery 404 shown in FIG. 4 is charged via WPTS through the circuit including test rectifier 412, the test power receiver 112 can also receive its supply power directly from the test rectifier 412 instead of, or in addition to test power receiver 112 being powered by test battery 404. Moreover, test battery 404 is also the main power supply for test device 110 in the example embodiment, but is shown as included in the test power receiver 112 because of the integrated design characteristics of test power receiver 112 in test device 110. Also, it can be noted that the use of multiple test antennas (e.g., test antennas 408, 416, and 420) is one example of implementation of test power receiver 112 and the test power receiver architecture structure can be reduced to one shared antenna, where the test power receiver 112 multiplexes signal reception and transmission.

Figure 5:
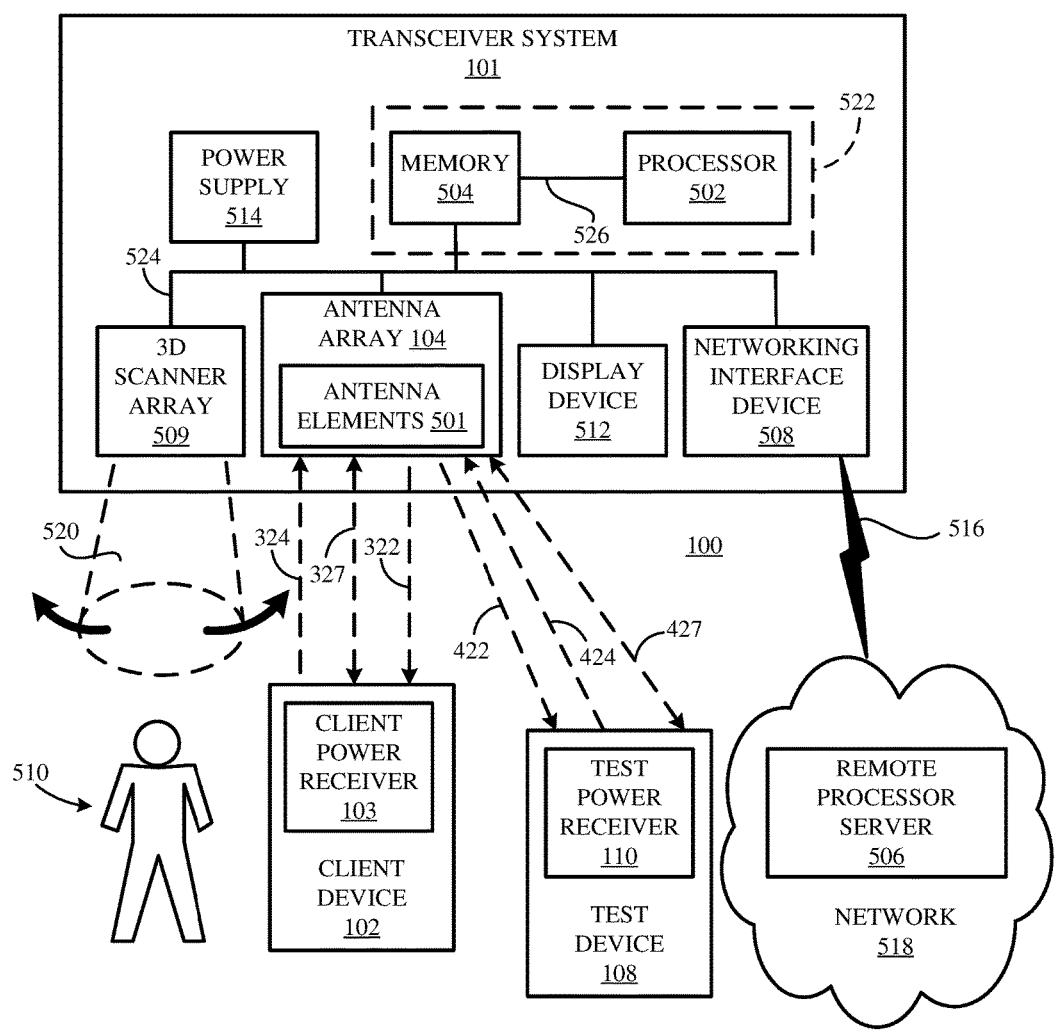
FIG. 5 is a block diagram illustrating an example transceiver system, according to some embodiments.

FIG. 5 is a block diagram illustrating an example transceiver system 500 in accordance with an embodiment (e.g., transceiver system 101 shown in FIGS. 1-4). The transceiver system 101 includes various functional components such as analog and digital electronic devices that are at least one of electrically and communicatively coupled together. In the example shown in FIG. 5, antenna array 104 includes a plurality of antenna elements 501 arranged within antenna array 104 with a fixed geometry (not shown) relative to one another. In other embodiments, antenna array 104 includes one antenna element 501. In still other embodiments, antenna array 104 includes a plurality of antenna elements 501, but is capable of functioning in transceiver system 101 to perform the processes and methods described herein when only on element 501 is actually functioning for Tx, Rx, and/or power delivery. The functional components of transceiver system 101 include a processor 502 and a memory 504 (including, e.g., a non-transitory processor-readable medium). Memory 504 stores various types and classes of data generated through, for example, the systems, methods, and processed described herein. Memory 504 also stores program instructions (e.g., software and/or firmware) that, when executed by processor 502, cause the processor 502 to manipulate (e.g., read, write, and delete operations, and combinations thereof) data stored in memory 504 and data stored in other transceiver system 101 components (e.g., data stored in registers and other data storage media thereof) associated with and/or communicatively coupled to processor 502 and/or memory 504. Through these data manipulations and other computation-related actions of processor 502 (e.g., carried out by an arithmetic logic unit and/or CPU of processor 502), the program instructions direct the implementation of the methods and processes herein described.

The various functionality described herein for processor 502 and/or memory 504 may, in some embodiments, be carried out by substantially similar components of a remote processor server 506 (e.g., networked cloud server). For example, remote processor server 506 located some distance from transceiver system 101 includes a remote processor server 506 processor and a memory, not shown. For considerations such as speed of data processing, amount and/or availability of data storage in memory, and reducing the size of the transceiver system 101, remote processor server 506 may entirely replace processor 502 and/or memory 504 in transceiver system 101, or may supplement a fraction of that functionality in transceiver system 101.

Transceiver system 101 also includes a network interface device 508 which is capable of receiving and transmitting data over a wired or wireless network communications protocol, including data retrieved from and/or stored in memory 504 that is received from and/or transmitted to, respectively, client 102 and/or test 110 device, and/or a cloud-based application executed by one or more processors in a computing device of remote processor server 506). In the example embodiment, transceiver system 101 further includes a three-dimensional (3D) scanner array 509. 3D scanner array 509 acquires data representative of a physical layout of the environment including, for instance, distances between walls, distances between a ceiling and a floor, and relative positions of objects in the room. Using data from the 3D scanner array 509, processor 502 is capable of generating a detailed model of environment 100 as precise and accurate as a measurement and data acquisition precision and accuracy of 3D scanner array 509. The 3D scanner array includes, for example and without limitation, scanning infrared (IR) and/or laser range-finding 3D mapping systems to generate a detailed model of 3D spaces such as a room. A user of transceiver system 101 may interact with the 3D model stored in transceiver system 101 and/or elsewhere to assign identifiers to portions (e.g., immovable objects like a window sill and or movable objects such as furniture) of the 3D model and also assign a name (e.g., master bedroom) to the 3D model. In other embodiments, transceiver system 101 and/or other computing systems assign identifiers and/or names to the 3D model which are dynamically assigned as objects and/or other attributes of the respective 3D space change over time.

Transceiver system 101 also includes a display device 512. User-friendly values (e.g., a processor 502-rendered 3D model of environment 100) may be displayed on display device 512 that is visible to a user and/or they may be transmitted to a computing device such as a laptop or desktop computer (not shown in FIG. 5) of the user that is communicatively coupled to transceiver system 101. Furthermore, transceiver system 101 includes a power supply 514 which provides appropriate levels of electric power to network interface device 508, 3D scanner array 509, antenna array 104, processor 502, and, as needed, memory 504.

In response to herein-described inputs and/or events including receipt of beacon signal 324 and/or test beacon signal 424 at antenna array 104, processor 502 executes the program instructions to implement the methods and processes described herein. Additional events such as receipt, via network interface device 508, of network traffic 516 including data and/or other signals from a network 518 further cause processor 502 to execute program instructions stored in memory 504 to implement processes and methods in transceiver system 101, either instead of, or in addition to, the methods and processes herein described. Also, in the example embodiment, receipt of a signal from a user 510 computing device (e.g., in addition to, or instead of, client device 102) communicatively coupled, via network interface device 508, to processor 502 causes 3D scanner array 509 to emit an IR radiation pattern 520 in a plurality of orbital directions (denoted by arrows in FIG. 5) to generate the detailed model of a 3D space such as environment 100 embodied in a room of a house. Data such as ranges to a plurality of points on reflective surfaces 106 (not shown in FIG. 5) in the interior of the 3D space are stored as data in memory 504 and are used by processor 502 to generate (e.g., graphically render) the detailed model for viewing by user 510 on display device 512, and further for use in the methods and processes described herein. In some embodiments, processor 502 periodically emits IR radiation pattern 520 to generate the model without user 510 intervention.

In the example of FIG. 5, a computer system 522 includes processor 502 and memory 504. Various common components (e.g., cache memory) are omitted for illustrative simplicity. The computer system 522 is intended to illustrate a hardware device on which the various process and methods described herein can be implemented. The components of computer system 522 and other components of transceiver system 101 can be coupled together via a power and data bus 524 bus or through some other known or convenient device.

The processor 502 shown in FIG. 5 may be, for example, a conventional microprocessor, microcontroller, a fieldprogrammable gate array (FPGA), and combinations thereof. One of skill in the relevant art will recognize that the terms "processor-readable (storage) medium" or "computer-readable (storage) medium" include any type of device that is accessible by processor 502. Memory 504 is communicatively coupled to processor 502 by, for example, a memory bus 526. In addition to non-transitory media, the memory 504 can include, by way of example but not limitation, random access memory (RAM), such as dynamic RAM (DRAM) and static RAM (SRAM). The memory 504 can be local, remote, or distributed. Non-transitory (e.g., non-volatile) memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory 504 during execution of program instructions by processor 502. The non-volatile memory can be local, remote, or distributed.

Program instructions (e.g., software) is typically stored in non-volatile portions of memory 504 and/or a drive unit (not shown in FIG. 5). Indeed, for large programs, it may not even be possible to store the entire program in the memory 504. Nevertheless, it should be understood that for software to run, if necessary, it is moved to a processor 502-readable location appropriate for processing, and for illustrative purposes, that location is referred herein to as the memory 504. Even when software is moved to the memory 504 for execution, the processor 502 will typically make use of hardware registers to store values associated with the software, and further will cache those values locally to, ideally, speed up execution of program instructions and related operations with respect to memory 504. As used herein, a software program is assumed to be stored at any known or convenient location (from non-volatile storage to hardware registers) when the software program is referred to as "executed by and implemented in a processor 502-readable medium,", and similar terminology. A processor such as processor 502 is considered to be "configured to execute a program" when at least one value associated with the program is stored in a register readable by the processor.

The bus (e.g., data carrying portions of power and data bus 524) also couples the processor 502 and, optionally, the memory 504 to the network interface device 508. The network interface device 508 can include one or more of a modem, a router, and a network interface (e.g., a network interface card (NIC)). It will be appreciated that a modem or network interface can be considered to be part of the computer system 522. The network interface device 508 can include an analog modem, ISDN modem, cable modem, token ring interface, satellite transmission interface (e.g. "direct PC"), or other interfaces for coupling computer system 522 to other computer systems (e.g., remote processor server 506). The network interface device 508 can include one or more input and/or output (I/O) devices. The I/O devices can include, by way of example but not limitation, a keyboard, a mouse or other pointing device, disk drives, printers, a scanner, and other input and/or output devices, including display device 512. The display device 512 can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the transceiver system 101.

In operation, the computer system 522 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in non-volatile portions of memory 504 and/or drive unit, and causes the processor 502 to execute the various acts required by the operating system to input and output data and to store data in the memory 504, including storing files on the non-volatile memory and/or drive unit.

Figure 6:
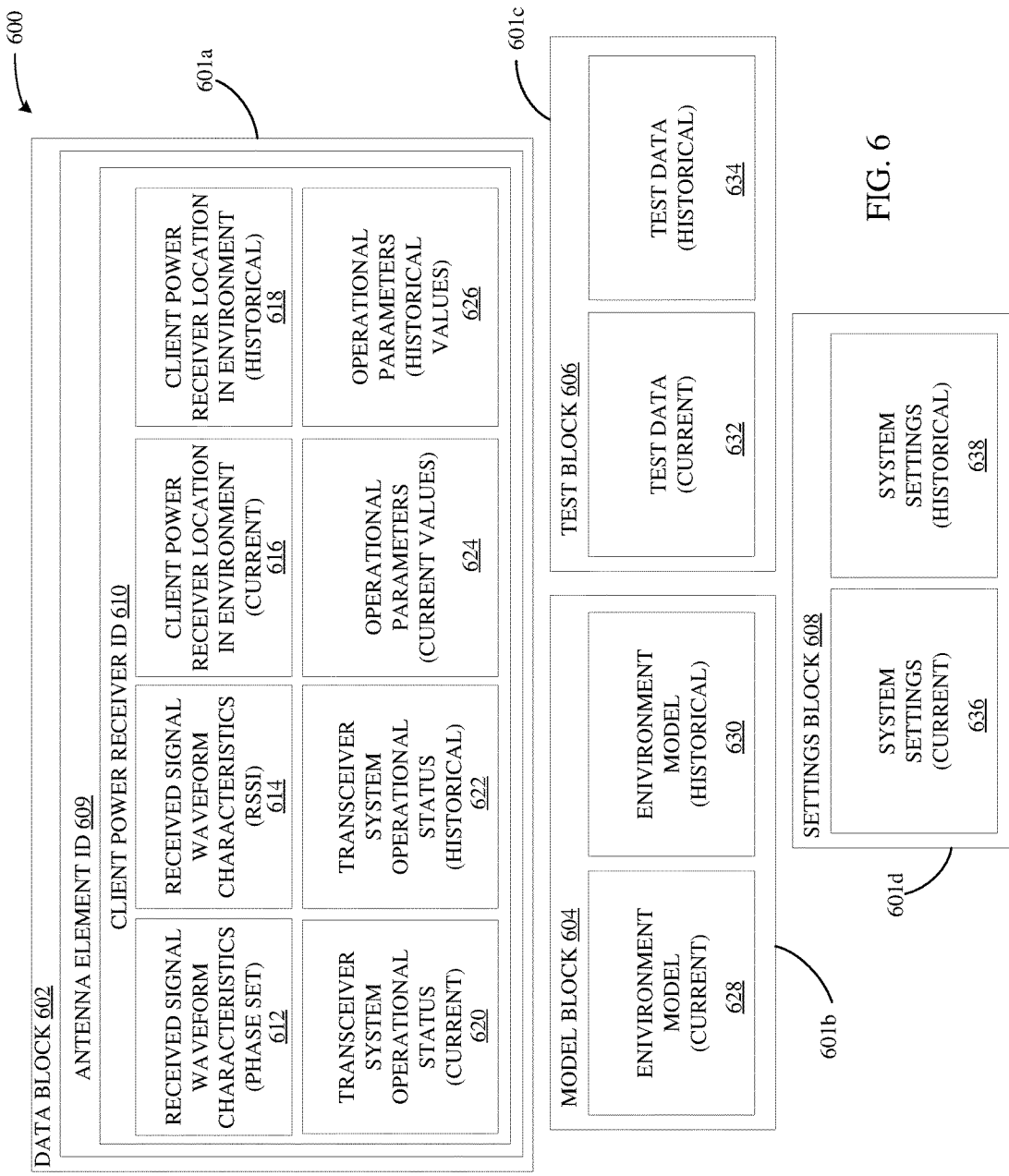
FIG. 6 is a block diagram illustrating an example data table algorithm processing and architecture, according to some embodiments.

FIG. 6 is a block diagram illustrating an example data table algorithm processing and architecture 600 in accordance with an embodiment. Data table algorithm processing and architecture 600 includes a plurality of memory blocks 601. A first memory block 601*a* includes a data block 602, a second memory block 601*b* includes a model block 604, a third memory block 601*c* includes a test block 606, and a fourth memory block 601*d* includes a settings block 608. Data block 602 includes at least one antenna element ID sub-block 609. In the example shown in FIG. 6, a first antenna element ID sub-block 609 of a plurality of sub-blocks 609 is established for a first antenna element 501 of the plurality of antenna elements 501 of the antenna array 104. Also, in the example embodiment, the first antenna element ID sub-block 609 includes at least one client power receiver ID sub-block 610. In the example shown in FIG. 6, a first client power receiver ID sub-block 610 is established for a first client power receiver 103 positioned in environment 100 with transceiver system 101, as shown and described above with reference to FIGS. 1-3. Although not illustrated in FIG. 6, it is understood that where a plurality of client power receivers 103 are present in environment 100 with transceiver system 101, respective antenna element ID sub-blocks 609 include a plurality of client power receiver sub-blocks 610, each sub-block 610 established for a respective client power receiver 103.

Each antenna element ID sub-block 609 includes at least eight data table sets (e.g., table sets 612-626). Data table sets 612-626 are stored in memory 504 and are used by the processor 502 of transceiver system 101 to determine operational status of components (e.g., in at least one of transceiver system 101, client device 102, and client power receiver 103) of a wireless signal transmission environment (e.g., environment 100). In some embodiments, and either instead of, or in addition to being stored in memory 504 and/or used by processor 502, at least one data table set of data table sets 612-626 are stored in a memory of remote processor server 506, and are further used by at least one processor of remote processor server 506 to implement, at least in part, the processes and methods described herein.

When the client power receiver 103 is transmitting beacon signal 324, transceiver system 101 is in a listening mode (e.g., receiving signals from client power receiver 103). When a predetermined tone of beacon signal 324 is detected by at least one element 501 of antenna array 104, information encoded (e.g., ASK, FSK, etc.) in beacon signal 324 is decoded by transceiver system 101 to determine a client power receiver 103 identification (ID, e.g., a unique IMEI number, a serial number, a mobile phone number, and/or a user 510-assigned alphanumeric identifier). Determining client power receiver 103 ID provides for accurately and efficiently addressing associated data to be read, stored, deleted, and further manipulated by processor 502 into the respective client power receiver ID sub-block 610 for the respective antenna element ID sub-block 609. Signals received from client power receiver 103 at each antenna element 501 are analyzed by processor 502 to determined waveform characteristics. For example, a waveform characteristic of the received signal includes a time of arrival (TOA) of the signal. Thus, a time/date stamp for the received signal from the respective client power receiver 103 represents data stored in client power receiver ID sub-block 610. Signals received at each antenna element 501 are also analyzed by processor 502 to determine additional waveform characteristics including, without limitation, phase sets and received signal strength (e.g., RSSI), and these data are stored in data table sets 612 and 614, respectively. Such data from analysis of client power receiver 103 signals received at each antenna element 501 are stored in respective client power receiver ID sub-blocks 610 for a predetermined amount of time before being over-written (e.g., as part of a FIFO scheme whose settings are stored in settings block 608) with new data from the aforementioned analyses. Where a very large amount of historical data is to be stored in client power receiver ID sub-blocks 610 (e.g., data table sets 612 and 614), a memory in remote processor server 506 is used in the exemplary embodiment to store a predetermined number of such historical data points for respective antenna element 501/client power receiver 103/location combinations.

Using determined waveform characteristics of signals received by each antenna element 501 from client power receivers 103, processor 502 determines respective locations of client power receivers 103 in environment 100. In the example embodiment, a determined current location of a particular client power receiver 103 is stored in memory 504 as data table set 616. With new current locations determined over time for a respective client power receiver 103, a predetermined number of historical determined locations are stored in data table set 618 in a remote processor server 506 memory, and deleted from memory 504 after a predetermined amount of time.

Processor 502 also uses the data stored in client power receiver ID sub-block 610 for determining an operational status of the transceiver system 101. Operational status determination may also include determining an operational status of client power receiver 103 and/or client device 102. For example, and as further shown and described with respect to FIGS. 7-9, determining a "current" operational status of transceiver system 101 includes comparing currently determined values of acquired and stored data values for waveform characteristics and locations for respective client power receivers 103 with historical values (e.g., prior-stored and expected values associated with a "last known good" operational status of transceiver system 101) stored in table sets 612, 614, 616, and 618, respectively.

In a first example, a first client power receiver 103 positioned at a first location or subset of locations in environment 100 (e.g., a locational zone, or block in the case of a 3D space) historically averages −20 dB RSSI at all elements 501 of antenna array 104. A current RSSI is determined by processor 502 to be −10 dB at a second element 501, but current RSSI remains substantially equal to −20 dB at all other elements 501 of antenna array 104. Such a scenario as determined by processor 502 is indicative, but not necessarily fully determinative, of a functional issue with the second element 501. Thus, a current operational status of transceiver system 101 in this first example is determined, stored, and transmitted (in human readable form as an alert message to user 510 and/or a system administrator) to convey information such as "Mar. 9, 2017, 3:21 pm: transceiver system→second antenna element→suspect functional issue." This current transceiver system operational status is stored as processor 502-readable data in table set 620 in memory 504.

With new current transceiver system operational statuses (a newest of which is not necessarily different from a next prior-determined transceiver system 101 operational status) determined over time for the respective antenna element 501/client power receiver 103/location combination, a predetermined number of historical determined transceiver system operational statuses are stored in data table set 622 in remote processor server 506 memory, and deleted from memory 504 after a predetermined amount of time. For example, and without limitation, a new current transceiver system 101 operational status is determined and stored in memory 504 (and further stored in remote processor server 506 memory) using the methods and processes described herein at predetermined intervals of time over a period of time beginning when a client power receiver 103 signal (e.g., beacon signal 324) is received by the transceiver system 101. Thus, determining and storing (e.g., in the remote processor server 506 memory for a longer amount of time than data for new current transceiver system 101 operational statuses are stored in memory 504) new current transceiver system 101 operational statuses over multiple periods of time (e.g., beginning and ending at the start and conclusion, respectively, of the transceiver system 101) facilitates tracking a plurality of historical operational statuses for the transceiver system for the benefit of identifying, diagnosing, troubleshooting, and remedying functional problems that may arise with components of the wireless signal transmission environment 100, including one or more antenna elements 501.

Data table set 624 stores current values of operational parameters determined by processor 502. Operational parameters include, for example and without limitation, operating temperature at one or more points proximate each antenna element 501. In a second example, a temperature value at such point(s) may be determined by processor 502 coupled to temperature sensor(s) at the point(s), and temperature value(s) determined to be outside a predetermined range of values (e.g., stored as data in settings block 608) or substantially different from historical values (e.g., including average value(s) for a respective antenna element 501 determined by processor 502 and/or remote processor server 506 processor, and stored in data table set 626 in memory 504 and/or remote processor server 506 memory). A scenario such as described in this second example, and also drawing from the first example described above, causes a current operational status of transceiver system 101 to be determined, stored, and transmitted to convey information such as "Apr. 9, 2017, 3:21 pm: transceiver system→second antenna element→high temperature→probable functional issue." In this case, "suspect functional issue" was elevated to "probable functional issue" due to the operational parameter (e.g., temperature) determined to be outside a predetermined and/or historical range of values.

In a third example, where an operational parameter such as temperature is determined to exceed a certain predetermined value or range of values by a predetermined extent, such a scenario cause the current operational status of transceiver system 101 to be determined, stored, and transmitted to convey information such as "May 9, 2017, 3:21 pm: transceiver system→second antenna element→extreme temperature→functional issue determined." Also, in this third example, after the current operational status of transceiver system 101 is communicated as an alert message, processor 502 is further programmed to cause the second element 501 to be powered off or placed in a low power mode so as to lower its temperature and mitigate undesired effects on other transceiver system 101 components. With new current values of operational values (a newest of which is not necessarily different from a next prior-determined operational parameter value) determined over time for the respective antenna element 501/client power receiver 103/ location combination, a predetermined number of historical determined operational parameter values are stored in data table set 622 in remote processor server 506 memory, and deleted from memory 504 after a predetermined amount of time.

Further, in the example shown in FIG. 6, model block 604 maintains at least two data table sets. A data table set 628 stores data for a current environment model (e.g., data acquired by 3D scanner array 509 mapping environment 100 embodied in a 3D space such as a room in a house). For example, in the example embodiment, 3D scanner array 509 is, like transceiver system 101, located in a fixed position in environment 100. Upon the direction of processor 502, 3D scanner array 509 obtains a large number (10's to millions or more) of range measurements from, for example, an IR radiation pattern directed from scanner 509 along a plurality of 3D vector directions and reflecting off substantially all surfaces in 3D space environment 100 in LOS of scanner 509 (except for, in some embodiments, a ceiling of the room, which may be assumed to be a plane parallel to a floor and not having LOS-obstructive objects 108 attached thereto). For example, scanner 509-to-surface-to-scanner 509 detector time of flight (TOF) determinations yield numerous distance measurements stored in model block 604 that are used by processor 502 and/or remote processor server 506 processor to render a detailed 3D map (e.g., a hologram) of environment 100.

For example, and as further shown and described with reference to FIGS. 7-9, an environment 100 such as a room having furniture and various other objects that are readily movable by user 510 is a dynamic, rather than static, environment. Thus, a current model of environment 100 determined at a first time point will not be representative of the actual conditions present in the 3D space at a second time point after the first time point if, at some point in time between the first and second time point, one or more LOS-reflective objects 108 change position in environment 100. In a fourth example, processor 502 determining that a current transceiver system 101 operational status includes a "suspect" functional issue of a second antenna element 501 (e.g., from the first example described above) further causes processor 502 to use 3D scanner array 509 to generate an updated model of environment 100 to replace a next prior-stored model stored in data table set 628.

If, in this fourth example, processor 502 further determines that, based on the updated environment model, LOS between the respective client power receiver 103 and the second antenna element 501 has become at least partially obscured by an LOS-obstructive object 108, processor 502 may direct the transmission of an alert message to user 510 to place his or her client device 102 associated with the respective client power receiver 103 in a new position that is fully in LOS with antenna array 104. With new current environment models (a newest of which is not necessarily different from a next prior-determined transceiver system 101 operational status) determined over time for the respective environment 100 in which client power receiver 103 and transceiver system 101 are positioned, a predetermined number of historical determined environment models are stored in data table set 630 in remote processor server 506 memory, and deleted from memory 504 after a predetermined amount of time.

Also, in the embodiment shown in FIG. 6, test block 606 maintains at least two data table sets. A data table set 632 stores current test data for test device 110 and test power receiver 112, and a data table set 634 historical test data. For example, in the example embodiment, test power receiver 112 is, like antenna array 104, located in a fixed position in environment 100 in LOS therewith. Through test program instructions stored in test storage media 403 and executed by test controller 401 and/or test control logic 402, test battery 404 is maintained at a substantially constant state of charge (SOC) that is less than a full charge state (e.g., about 90% SOC of full charge, i.e., 100% SOC). Maintaining test battery 404 at a substantially constant state of charge is achieved, in the example embodiment, through processor 502-directed charging and discharging of test battery 404 respectively by, for example, controlling a timing of switching test battery 404 to an AC-to-DC converted charging power source and a resistive discharging circuit (e.g., an aesthetic arrangement of multi-colored LEDs configurable to suit the tastes of the user 510 and/or at least one speaker outputting sounds associated with a user 510 selected collection of music tracks).

Upon the direction of processor 502, a test begins with transceiver system 101 transmitting test power transmission signal 422 to test power receiver 112 for a predetermined amount of time (e.g., stored as data in settings block 608). Test data acquired from at least one of test battery 404, test power meter 410, and charge rate instrument 421 is stored locally in test storage media 403, and then provided as needed to memory 504 and/or remote processor server 506 memory. Thus, like all the data table sets shown in FIG. 6, it is possible for data associated with table sets 632 and 634 to be stored simultaneously apportioned across at least portions of memory devices positioned in numerous components (e.g., two or more of transceiver system 101, test power receiver 112, remote processor server 506, and client power receiver 103). Current test data includes, for example and without limitation, test controller 401 determined instantaneous and/or average charge rate values over a predetermined time period during which test power transmission signal 422 is received by test power receiver 112 to charge test battery 404 from about 90% SOC to about 95% SOC. With new current test data (a newest of which is not necessarily different from a next prior-determined test data set) determined over time for the respective environment 100 in which test power receiver 112 and transceiver system 101 are situated, a predetermined number of historical determined test data sets are stored in data table set 634 in remote processor server 506 memory, and deleted from memory 504 and/or test storage media 403 after a predetermined amount of time.

In a fifth example, for a respective antenna element 501 having a suspected functional issue (e.g., second element 501 of the first example discussed above), the respective element 501 is subjected to the aforementioned test procedure. If, for example, Tx and Rx of test data signal 427 by the second element 501 to/from test power receiver 112 is satisfactory and second element 501 successfully transmits test power transmission signal 422 to charge test battery 404 in accordance with expected historical test data and/or predetermined specifications (e.g., stored in settings block 608), then the second element 501 may be ruled out by processor 502 as having a functional issue. Accordingly, the respective client power receiver 103 may not be ruled out as having a functional issue. Thus, in this fifth example, a current operational status of transceiver system 101 is determined, stored, and transmitted (in human readable form as an alert message to user 510 and/or a system administrator) to convey information such as "Jun. 9, 2017, 3:21 pm: transceiver system→second antenna element OK→suspect client power receiver ID 12345 functional issue."

Further, in the embodiment shown in FIG. 6, settings block 608 maintains at least two data table sets. A data table set 636 stores current system settings data for respective client power receiver(s) 103, test device 110, test power receiver 112, remote processor server 506, and transceiver system 101. A data table set 638 stores historical system settings data. For example, in the example embodiment, current system settings may be assigned user 510 and/or a system administrator. System settings generally relate to assigned values and other data that dictate various aspects of the behavior, as directed by at least one of processor 502, test controller 401, test control logic 402, controller 301, control logic 302, and remote processor server 506 processor.

System settings are, for example, the several predetermined values, ranges of values, and time periods discussed herein. In terms of algorithms implemented from program instructions by the processors, controllers, and/or control logic described above, system settings include constants which, as opposed to variable inputs for such algorithms, are not ordinarily subject to change based on observable, measurable, and/or determinable physical phenomena. For instance, in the third example set forth above, a temperature sensor provides processor 502 a value for current temperature proximate second antenna element 501 which is compared by a processor 502-implemented algorithm for determining current operational parameters and storing them in data table set 624. The value for current temperature is a variable because it represents a quantifiable physical condition of second element 501 that is, during operation of transceiver system 101, subject to change from its currently determined value. This algorithm also uses at least one constant to compare the current determined operational parameter to (e.g., current temperature of second element 501). In this third example, the constant is a certain predetermined temperature value and/or a predetermined extent value by which the current temperature of second element 501 must exceed the predetermined temperature value such that processor 502 determines an operational status of transceiver system 101 which includes a determined functional issue based on the determined temperature value.

In a variation on the provided third example, where an ambient temperature of environment 100 may influence a determination by processor 502 of an abnormal functional issue of second element 501 based on current (and variable) temperature value, the certain (and constant, e.g., set point) predetermined temperature value that the algorithm compares the current temperature value to may be changed by user 510 and/or a system administrator. For instance, if the ambient temperature of a room having transceiver system 101 is adjusted from room temperature to 12 degrees Celsius (° C.), the predetermined temperature set point value for second element 501 may be updated and adjusted downward from a currently-stored value of 135° C. to 132° C. The pre-update constant value 135° C. thus becomes historical system setting data stored in data table set 638 and the updated constant value 132° C. becomes the current system setting data stored in data table set 636.

The several examples provided above with respect to FIG. 6 are intended to illustrate in a non-limited manner how the various data values are stored in the several memory devices shown and described herein. The various types, or classes, of data are manipulated by the one or more processors of transceiver system 101, client power receiver 103, test power receiver 112, and/or remote processor server 506 to implement the methods and processes described herein. In addition to specific examples herein discussed (e.g., the first through fifth examples provided with reference to FIG. 6), one having ordinary skill in the art will appreciate how numerous other examples which, although not specifically described, are applicable to the systems, process, and methods for determining operational status of components of a wireless signal transmission environment.

Figure 7B:
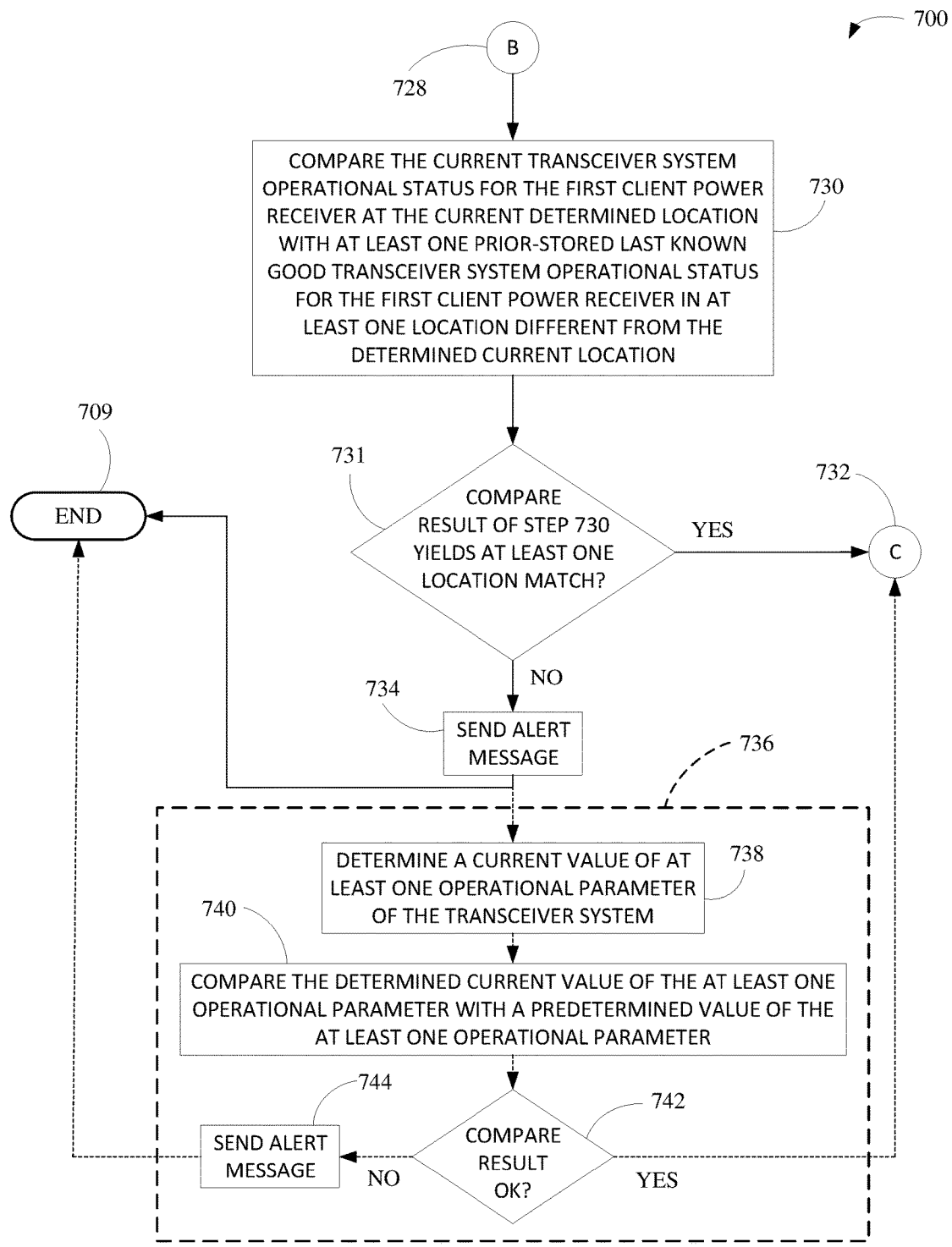

FIGS. 7A, 7B, 7C, 7D, and 7E are flow diagrams including logical states which illustrate an example process 700 for determining operational status of components of a wireless signal transmission environment in accordance with an embodiment. Referring to FIG. 7A, process 700 begins from a start state 702 including, for example, a powered down or low power state of at least one of transceiver system 101 and client power receiver 103. For instance, transceiver system 101 may be in such a low power state at such times when there are no client power receivers 103 positioned in environment 100 with transceiver system 101. In some embodiments, transceiver system 101 periodically awakes from the low power state at a predetermined frequency to determine the presence of one or more client power receivers 103 in environment (e.g., by "listening" for a beacon signal 324). In other embodiments, transceiver system 101 awakes from a low power state upon antenna array 104 first receiving a pertinent signal from environment 100 after not having received a signal for a predetermined duration of time.

Process 700 proceeds from start state 702 to a first binary branch 704 during which the transceiver system 101 (e.g., using its processor 502 and/or antenna array 104) determines if a signal received is a signal (e.g., a first beacon signal 324) received from a first client power receiver 103 in environment 100. If the signal received is from first client power receiver 103, process 700 proceeds from first binary branch 704 to a step 706. During step 706, transceiver system 101 acquires (using processor 502 and/or antenna array 104) and stores (in memory 504 and/or a remote processor server 506 memory) data values for waveform characteristics of the beacon signal received from the first client power receiver 103.

If, however, it is determined that the signal has not been received at antenna array 104 from first client power receiver 103, process 700 proceeds from first binary branch 704 to a second binary branch 707 instead of proceeding to step 706. During second binary branch 707, processor 502 and/or antenna array 104 of transceiver system 101 determines if the signal received is a signal (e.g., a second beacon signal 324) received from a second client power receiver 103 in environment 100. If the signal received is from a second client power receiver 103, process 700 proceeds from second binary branch 707 to a step 708. During step 708, processor 502 and/or antenna array 104 goes to step 706 to acquire and store data values for waveform characteristics of the signal received from the second client power receiver 103. However, if, during second binary branch 707, it is determined that the signal has not been received at antenna array 104 from second client power receiver 103, process 700 proceeds from second binary branch 707 to an end state 709. Transceiver system 101 placed into end state 709 includes, for example and without limitation, the powered down or low power states described above with respect to start state 702.

After completing step 706, process 700 proceeds to a step 710 during which processor 502 and/or remote processor server 506 processor counts (e.g., using one or more processor clocks) and allows a predetermined time period to elapse. Step 710 thereby provides process 700 adequate time for the acquisition and storage of the data values for waveform characteristics. For instance, in the example embodiment, beacon signal 324 is transmitted from client power receiver 103 to antenna array 104 as a series of bursts over a set amount of time. Thus, the amount of time passing in step 710 is at least as long as the predetermined set amount of time during which beacon signal 324 bursts are to be transmitted by the client power receiver 103. Following steps 706 and 710, process 700 proceeds to a step 712 during which processor 502 and/or remote processor server 506 processor analyzes the data for waveform characteristics of the signal that were acquired and stored during the predetermined time period specified by step 710.

Following step 712, process 700 proceeds to a step 714 during which processor 502 and/or remote processor server 506 processor determines and stores (e.g., in memory 504 and/or a remote processor server 506 memory) a current location of the first client power receiver 103 in environment 100 based, at least in part, on the step 712 analysis of the data values for waveform characteristics. Having determined and stored the current location, process 700 proceeds to a step 716 during which processor 502 and/or remote processor server 506 processor determines and stores (e.g., in memory 504 and/or a remote processor server 506 memory) a current transceiver system 101 operational status for the first client power receiver 103 at the determined current location. The determination performed in step 716 is based, at least in part, on the step 712 analysis of the data values for waveform characteristics for the first client power receiver 103 at the determined current location. After completing step 716, process 700 proceeds to a step 718. During step 718, processor 502 and/or remote processor server 506 processor compares the determined current transceiver system 101 operational status with a prior-stored last known good transceiver system 101 operational status for the first client power receiver 103 at the determined current location.

Following step 718, process 700 proceeds to a third binary branch 720 during which the transceiver system 101 and/or remote processor server 506 (e.g., using processor 502 and/or remote processor server 506 processor) determines if the determined current transceiver system 101 operational status matches (e.g., based on the result of the comparison of step 718 and based on predetermined performance criteria including, without limitation, a predetermined error threshold) the prior-stored last known good transceiver system 101 operational status for the first client power receiver 103 at the determined current location. If, during the third binary branch 720, it is determined that the current and prior-stored last known good operational statuses for the transceiver system 101 match to within the predetermined error threshold, process 700 proceeds from third binary branch 720 a step 722. During step 722, processor 502 and/or remote processor server 506 processor stores (e.g., in memory 504 and/or remote processor server 506 memory) the determined current transceiver system 101 operational status as a currently-stored last known good transceiver system 101 operational status for the first client power receiver 103 at the determined current location. Process 700 then proceeds from step 722 to a first transition 724 ("A").

From the first transition 724 ("A"), process 700 proceeds to a fourth binary branch 725 during which the transceiver system 101 and/or remote server 506 (e.g., using processor 502 and/or remote processor server 506) determines if the signal received by the transceiver system 101 is from the first client power receiver 103. If, during the fourth binary branch 725, it is determined that the received signal is from the first client power receiver 103, process 700 proceeds from fourth binary branch 725 to a step 726 and then goes to step 706 as described above. If, however, during the fourth binary branch 725, it is determined that the received signal is not from the first client power receiver, process 700 branches to the second binary branch 707, as described above.

During third binary branch 720, if the current and prior-stored last known good operational statuses for the transceiver system 101 do not acceptably match, process 700 instead proceeds from third binary branch 720 to a step 727. During step 727, processor 502 and/or remote processor server 506 processor transmits, via antenna array 104 and/or network 518, an alert message to user 510 and/or a system administrator to convey information indicating the negative result of third binary branch 720 in human readable form (e.g., "transceiver system in living room has a current operational status that does not match the last known good operational status—please call technical support at your earliest convenience"). After step 727, process 700 proceeds to a second transition 728 ("B"), as further described with reference to FIG. 7B. In other embodiments, step 727 is not performed in process 700 and second transition 728 is reached directly in the event of a negative result for third binary branch 720.

FIG. 7B illustrates a continuation of process 700 from the second transition 728. Thus, after step 727 (shown in FIG. 7A), process 700 proceeds to a step 730. During step 730, processor 502 and/or remote processor server 506 processor compares the current transceiver system 101 operational status determined in step 716 with a prior-stored last known good transceiver system 101 operational status for the first client power receiver 103 in at least one location in environment 100 that is different from the current location determined in step 714. Following step 730, process 700 proceeds to a fifth binary branch 731 during which the transceiver system 101 and/or remote processor server 506 (e.g., using processor 502 and/or remote processor server 506 processor) determines if the determined current transceiver system 101 operational status matches (e.g., is associated with, to within a predetermined error threshold) at least one location in environment 100 other than the current location determined in step 714. If an affirmative result is obtained from fifth binary branch 731, process 700 proceeds from fifth binary branch 731 to a third transition 732 ("C"), as further described with reference to FIG. 7C.

If, however, during fifth binary branch 731, it is determined that the determined current transceiver system 101 operational status does not match at least one location in environment 100 other than the current location determined in step 714, instead of proceeding to third transition 732, process 700 proceeds to a step 734. During step 734, processor 502 and/or remote processor server 506 processor transmits, via antenna array 104 and/or network 518, an alert message to user 510 and/or a system administrator to convey information indicating the negative result of fifth binary branch 731 in human readable form (e.g., "transceiver system in basement has a current operational status indicating a technical issue may be present—please call technical support at your earliest convenience"). In the example embodiment, process 700 proceeds to end state 709 after step 734. In other embodiments, step 734 is not performed in process 700 and the end state 709 is entered directly in the event of a negative result for fifth binary branch 731.

In some embodiments, after step 734, process 700 proceeds to a sub-process 736 rather than directly entering end state 709 following a negative result during fifth binary branch 731. Sub-process 736 begins with a step 738 during which a current value is determined for at least one operational parameter of the transceiver system 101. As described above with reference to FIG. 6 and in the associated examples provided, operational parameters include quantifiable and/or determinable quantities and/or states of components of transceiver system 101, the values or states of which provide valuable information for diagnostic and troubleshooting purposes. For instance, in the example embodiment, a current value of temperature may be determined by processor 502 using input data from a temperature sensor positioned proximity to one of the plurality of antenna elements 501 of antenna array 104. As one example, memory 504 and/or remote processor server 506 memory stores a predetermined value or range of values for operating temperature of the respective element 501 representing normal or expected values under one or more ambient temperatures of environment 100. Having determined the current value of the at least one operational parameter of the transceiver system 101 (e.g., temperature of a respective element 501) during step 738, sub-process 736 proceeds from step 738 to a step 740. During step 740, processor 502 and/or remote processor server 506 processor compares the determined current value of the at least one operational parameter with the predetermined value (e.g., a set point value or range of values) of the at least one operational parameter.

After step 740, sub-process 736 proceeds to a sixth binary branch 742 during which processor 502 and/or remote processor server 506 processor determines whether or not the result of the comparison performed in step 740 is acceptable. If an affirmative result is obtained from the sixth binary branch 742, process 700 proceeds from step 742 to the third transition 732. In the event of a negative result obtained from the sixth binary branch 742, for example, and without limitation, if the current determined temperature value for a respective element 501 is 41° C. and the acceptable temperature range of values for a given ambient environment 100 temperature is 32° C. to 39° C., the current determined value is not acceptable, and process 700 proceeds from sixth binary branch 742 to a step 744. During step 744, processor 502 and/or remote processor server 506 processor transmits, via antenna array 104 and/or network 518, an alert message to user 510 and/or a system administrator to convey information indicating the negative result of sixth binary branch 742 in human readable form (e.g., "transceiver system experiencing high temperature condition for the third antenna element—please call technical support at your earliest convenience"). In the example embodiment, process 700 proceeds to end state 709 after step 744. In other embodiments, step 744 is not performed in process 700 and the end state 709 is entered directly in the event of a negative result for sixth binary branch 742.

Thus, process 700 employing sub-process 738 after a negative result obtained from fifth binary branch 731 provides valuable specific information which facilitates diagnosing and troubleshooting of issues related to determined current transceiver system 101 operational statuses that are not exhibiting expected characteristics as compared to prior-stored last known good operational statuses. In other embodiments, process 700 executes sub-process 736 at other points and associated with other steps and binary branches than what is illustrated in FIG. 7B to provide user 510 and/or a system administrator with valuable specific information concerning which components of transceiver system 101 are likely behind determined and/or suspected functional problems and/or operational status issues. Therefore, as compared to process 700 not including one or more instances of sub-process 736, inclusion of instance(s) of sub-process 736 in process 700 further facilitates faster and less costly troubleshooting and maintenance activities if they are needed to resolve functional problems and/or operational status issues for transceiver system 101.

Figure 7C:
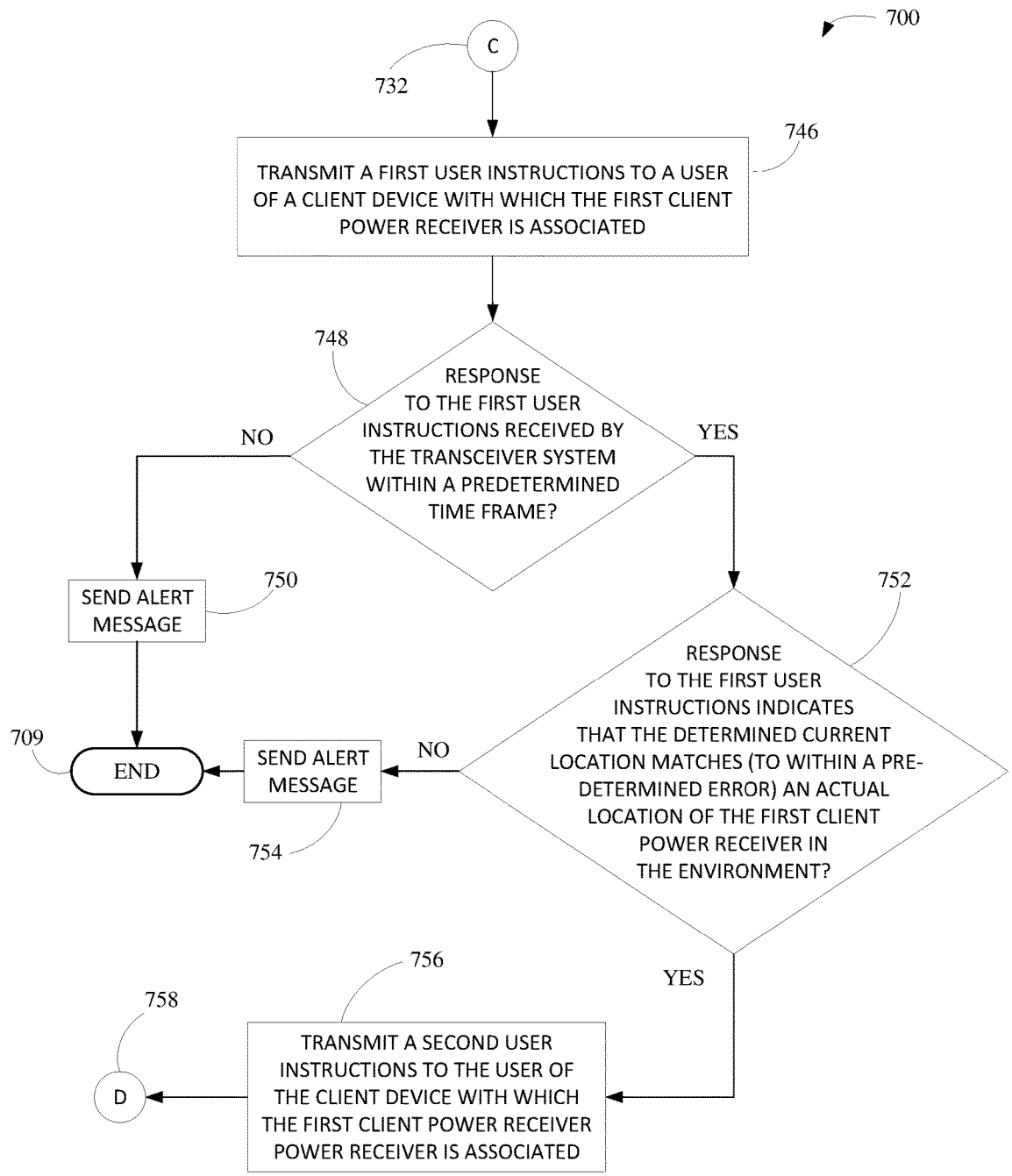

FIG. 7C illustrates a continuation of process 700 from the third transition 732. Thus, after affirmative results in either fifth 731 or sixth 742 binary branches (shown in FIG. 7B), process 700 proceeds to a step 746. During step 746, processor 502 and/or remote processor server 506 processor transmits, via antenna array 104 and/or network 518, a first user instructions to user 510 of a client device 102 with which the first client power receiver 103 is associated. In the example embodiment, first user instructions convey to user 510 a request for him or her to perform a troubleshooting-related action in environment 100. Specifically, first user instructions direct user 510 to respond (e.g., by a text message, phone call, or email reply within a predetermined time frame after receiving first user instructions) indicating the actual current location in environment 100 of the client device 102 associated with the first client power receiver 103. For instance, first user instructions may direct user 510 to the display device 512 of transceiver system 101 to view a 3D representation of environment 100 including numbered location zones in the corresponding 3D space of a room where transceiver system 101 is positioned. In the example embodiment, the response of user 510 to first user instructions thus includes user 510 providing the number of the location zone where user 510 observes the actual current location of the first client power receiver 103 to be. In some embodiments, the first user instructions are transmitted to, either instead of or in addition to, other computing and/or communications devices of user 510 such as via a call to a landline phone and an email to be read on an internet-connected personal computer. In still other embodiments, first user instructions are communicated verbally by a system administrator or customer service representative (including a technical support representative) to user 510 after being received in human readable form through, for example, network 518.

Following step 732, process 700 proceeds to a seventh binary branch 748 during which processor 502 and/or remote processor server 506 processor determines if user 510 has responded to first user instructions within the predetermined time frame. If a response by user 510 to the first user instructions is not received by the conclusion of the predetermined time frame, process 700 proceeds from seventh binary branch 748 to a step 750. During step 750, processor 502 and/or remote processor server 506 processor transmits, via antenna array 104 and/or network 518, an alert message to user 510 and/or a system administrator to convey information indicating the negative result of seventh binary branch 748 in human readable form (e.g., "a response to first user instructions not received within specified time frame—please call technical support at your earliest convenience"). In the example embodiment, process 700 proceeds to end state 709 after step 750. In other embodiments, step 750 is not performed in process 700 and the end state 709 is entered directly in the event of a negative result for seventh binary branch 748. In still other embodiments, process 700 executes sub-process 736 either instead of or in addition to step 750, and determines if pertinent operational parameters are indicative of acceptable conditions in transceiver system 101 to extend the predetermined time period and/or to again transmit first user instructions to user 510 and again wait for a response.

If, however, during seventh binary branch 748, it is determined that a response from user 510 is received by the conclusion of the predetermined time frame, process 700 proceeds from seventh binary branch 748 to an eighth binary branch 752. During seventh binary branch 752, processor 502 and/or remote processor server 506 processor determines whether or not the response from user 510 to first user instructions indicates that the determined current location of first client power receiver 103 matches (e.g., to within a predetermined error threshold) the user 510-reported actual current location of the first client power receiver 103 in environment 100. If a result of the eighth binary branch 752 is negative, then process 700 proceeds from eighth binary branch 752 to a step 754. During step 754, processor 502 and/or remote processor server 506 processor transmits, via antenna array 104 and/or network 518, an alert message to user 510 and/or a system administrator to convey information indicating the negative result of eighth binary branch 752 in human readable form (e.g., "actual and system-determined current location values do not match acceptably—please call technical support at your earliest convenience"). In the example embodiment, process 700 proceeds to end state 709 after step 754. In other embodiments, step 754 is not performed in process 700 and the end state 709 is entered directly in the event of a negative result for eighth binary branch 752. In still other embodiments, process 700 executes sub-process 736 either instead of or in addition to step 754, and determines if pertinent operational parameters are indicative of acceptable conditions in transceiver system 101 to permit further troubleshoot operations including, without limitation, user 510 contemporaneously contacting a technical support representative.

If, however, during eighth binary branch 752, it is determined that the response from user 510 to first user instructions indicates that the determined current location of first client power receiver 103 does match the user 510-reported actual current location of the first client power receiver 103 in environment 100, process 700 proceeds from eighth binary branch 752 to a step 756. During step 756, processor 502 and/or remote processor server 506 processor transmits, via antenna array 104 and/or network 518, a second user instructions to user 510 of a client device 102 with which the first client power receiver 103 is associated. In the example embodiment, second user instructions convey to user 510 a request for him or her to ensure that the client device 102 with which the first client power receiver 103 is associated is not moved from the actual current location report by user 510 as part of the response provided as determined by seventh binary branch 748. In some embodiments, the second user instructions are transmitted to, either instead of or in addition to, other computing and/or communications devices of user 510 such as via a call to a landline phone and an email to be read on an internet-connected personal computer. In still other embodiments, second user instructions are communicated verbally by a system administrator or customer service representative (including a technical support representative) to user 510 after being received in human readable form through, for example, network 518.

Figure 7D:
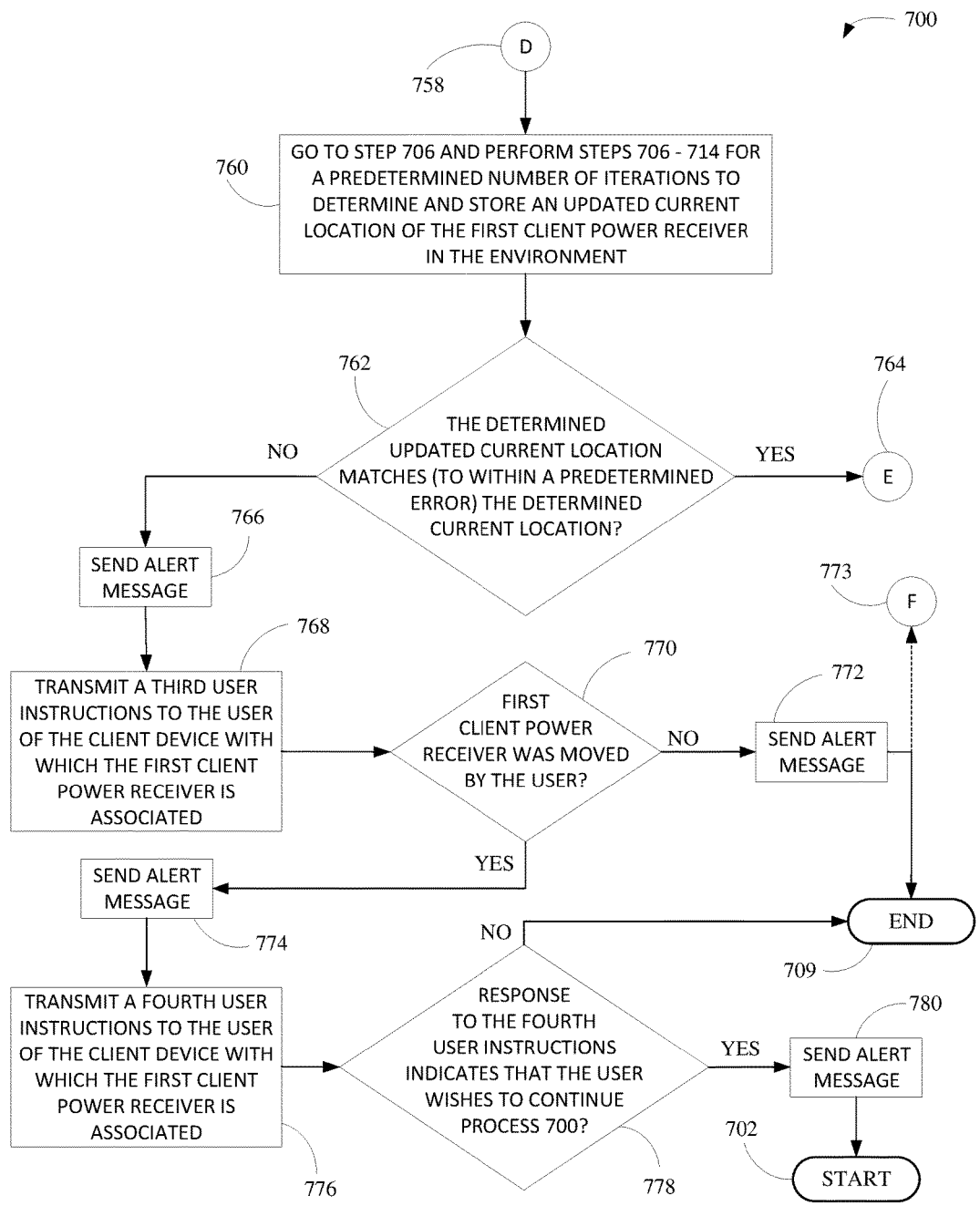

After step 756, process 700 reaches a fourth transition 758 ("D"). Referring now to FIG. 7D, from the fourth transition 758, process 700 proceeds to a step 760. During step 760, processor 502 and/or remote processor server 506 processor directs process 700 to go to step 706. Process 700 then proceeds to perform steps 706 through 714 for a predetermined number of iterations to determine and store, as described above with reference to FIG. 7A, an updated current location of the first client power receiver 103 in environment 100. Step 760 thus provides a check for whether user 510 adhered to second user instructions provided to him or her in step 756 (shown in FIG. 7C). Process 700 then proceeds from step 760 to a ninth binary branch 762 during which processor 502 and/or remote processor server 506 processor determines whether or not the step 760-determined updated current location matches (e.g., to within a predetermined error threshold) the step 714-determined current location of first client power receiver 103 in environment 100. If an affirmative result is determined during ninth binary branch 762, process 700 proceeds to a fifth transition 764 ("E"), as further described with reference to FIGS. 7E and 8.

However, if, a negative result is determined during ninth binary branch 762, process 700 proceeds to a step 766. During step 766, processor 502 and/or remote processor server 506 processor transmits, via antenna array 104 and/or network 518, an alert message to user 510 and/or a system administrator to convey information indicating the negative result of ninth binary branch 762 in human readable form (e.g., "the system has detected that the client device may have been moved since you reported its actual current location in your kitchen—please confirm by responding promptly to the next user instructions"). After step 766, process 700 proceeds to a step 768. During step 768, processor 502 and/or remote processor server 506 processor transmits, via antenna array 104 and/or network 518, a third user instructions to user 510 of a client device 102 with which the first client power receiver 103 is associated. In the example embodiment, third user instructions convey to user 510 a request for him or her to respond, within a predetermined time frame, as to whether or not, despite receiving second user instructions during step 756 (shown in FIG. 7C), user 510 moved the client device 102 associated with first client power receiver 103 from the actual current location he or she previously reported (e.g., "was the client device moved since you reported its actual current location in your kitchen?—please reply promptly and accurately"). In some embodiments, the third user instructions are transmitted to, either instead of or in addition to, other computing and/or communications devices of user 510 such as via a call to a landline phone and an email to be read on an internet-connected personal computer. In still other embodiments, third user instructions are communicated verbally by a system administrator or customer service representative (including a technical support representative) to user 510 after being received in human readable form through, for example, network 518.

From step 768, process 700 proceeds to a tenth binary branch 770 during which processor 502 and/or remote processor server 506 processor determines whether or not the response from user 510 to third user instructions indicates that the client device 102 associated with first client power receiver 103 was moved from the prior-reported actual location in environment 100. If a result of tenth binary branch 770 is negative, then process 700 proceeds from tenth binary branch 770 to a step 772. During step 772, processor 502 and/or remote processor server 506 processor transmits, via antenna array 104 and/or network 518, an alert message to user 510 and/or a system administrator to convey information indicating the negative result of tenth binary branch 770 in human readable form (e.g., "the system-determined movement of your client device in your kitchen appears to be in error—please call technical support at your earliest convenience"). In the example embodiment, process 700 proceeds to end state 709 after step 772. In other embodiments, step 772 is not performed in process 700 and the end state 709 is entered directly in the event of a negative result for tenth binary branch 770. In still other embodiments, process 700 executes sub-process 736 either instead of or in addition to step 772, and determines if pertinent operational parameters are indicative of acceptable conditions in transceiver system 101 to permit further troubleshoot operations including, without limitation, via a technical support representative contemporaneously speaking with user 510 and instructing him or her to perform additional troubleshooting-related actions. In yet other embodiments, process 700 proceeds to, either instead of in addition to sub-process 736 and/or step 772, a sixth transition 773 ("F") and performs a process 800, as shown and described with reference to FIGS. 8A and 8B.

If, however, during the tenth binary branch 770, it is determined that the response from user 510 to third user instructions indicates that the client device 102 associated with first client power receiver 103 was moved by user 510 since the time he or she reported its actual current location in environment 100, process 700 proceeds from tenth binary branch 770 to a step 774. During step 774, processor 502 and/or remote processor server 506 processor transmits, via antenna array 104 and/or network 518, an alert message to user 510 and/or a system administrator to convey information indicating the affirmative result of tenth binary branch 770 in human readable form (e.g., "the system-determined movement of your client device in your kitchen requires additional steps to be performed—if you wish to continue with these additional required steps, please promptly and accurately respond to the forthcoming additional user instructions").

After step 774 is performed, process 700 proceeds to a step 776 during which processor 502 and/or remote processor server 506 processor transmits, via antenna array 104 and/or network 518, a fourth user instructions to user 510 of a client device 102 with which the first client power receiver 103 is associated. In the example embodiment, fourth user instructions convey to user 510 a request for him or her to respond (e.g., by a text message or email reply within a predetermined time frame after receiving fourth user instructions) indicating his or her desire to continue with the additional required steps of process 700. In some embodiments, the fourth user instructions are transmitted to, either instead of or in addition to, other computing and/or communications devices of user 510 such as via a call to a landline phone and an email to be read on an internet-connected personal computer. In still other embodiments, fourth user instructions are communicated verbally by a system administrator or customer service representative (including a technical support representative) to user 510 after being received in human readable form through, for example, network 518.

After step 776 is performed, process 700 proceeds to an eleventh binary branch 778 during which processor 502 and/or remote processor server 506 processor determines whether or not the user 510 response to fourth user instructions indicates that the user 510 wishes to continue with the additional required steps of process 700. If a result of the eleventh binary branch 778 is negative, then process 700 proceeds from eleventh binary branch 778 to the end state 709. In some embodiments, process 700 executes sub-process 736 instead of directly entering end state 709 from eleventh binary branch 778, and determines if pertinent operational parameters are indicative of acceptable conditions in transceiver system 101 to permit further troubleshoot operations including, without limitation, via a technical support representative contemporaneously interacting with transceiver system 101 and/or remote processor server 506 via a remote network 518 connection mediated by processor 502 and/or remote processor server 506 processor through network interface device 508.

However, if an affirmative result is obtained during execution of the eleventh binary branch 778, process 700 instead proceeds to a step 780. During step 780, processor 502 and/or remote processor server 506 processor transmits, via antenna array 104 and/or network 518, an alert message to user 510 and/or a system administrator to convey information indicating the affirmative result of the eleventh binary branch 778 in human readable form (e.g., "since your client device in your kitchen was moved from the prior reported actual determined location, the system process will be restarted—please ensure that after next reporting the actual determined location of your client device in your kitchen, the client device is not moved until this process is completed"). In the example embodiment, process 700 proceeds to start state 702 after step 782. In other embodiments, step 782 is not performed in process 700 and the start state 702 is entered directly in the event of an affirmative result for eleventh binary branch 778. In still other embodiments, process 700 executes sub-process 736 either instead of or in addition to step 782, and determines if pertinent operational parameters are indicative of acceptable conditions in transceiver system 101 to permit process 700 to enter start state 702. If acceptable conditions are not present, then process 700 may instead enter end state 709 at this time and further alert message(s) and/or user instructions may be transmitted to user 510 and/or a system administrator to facilitate further appropriate troubleshooting operations.

Figure 7E:
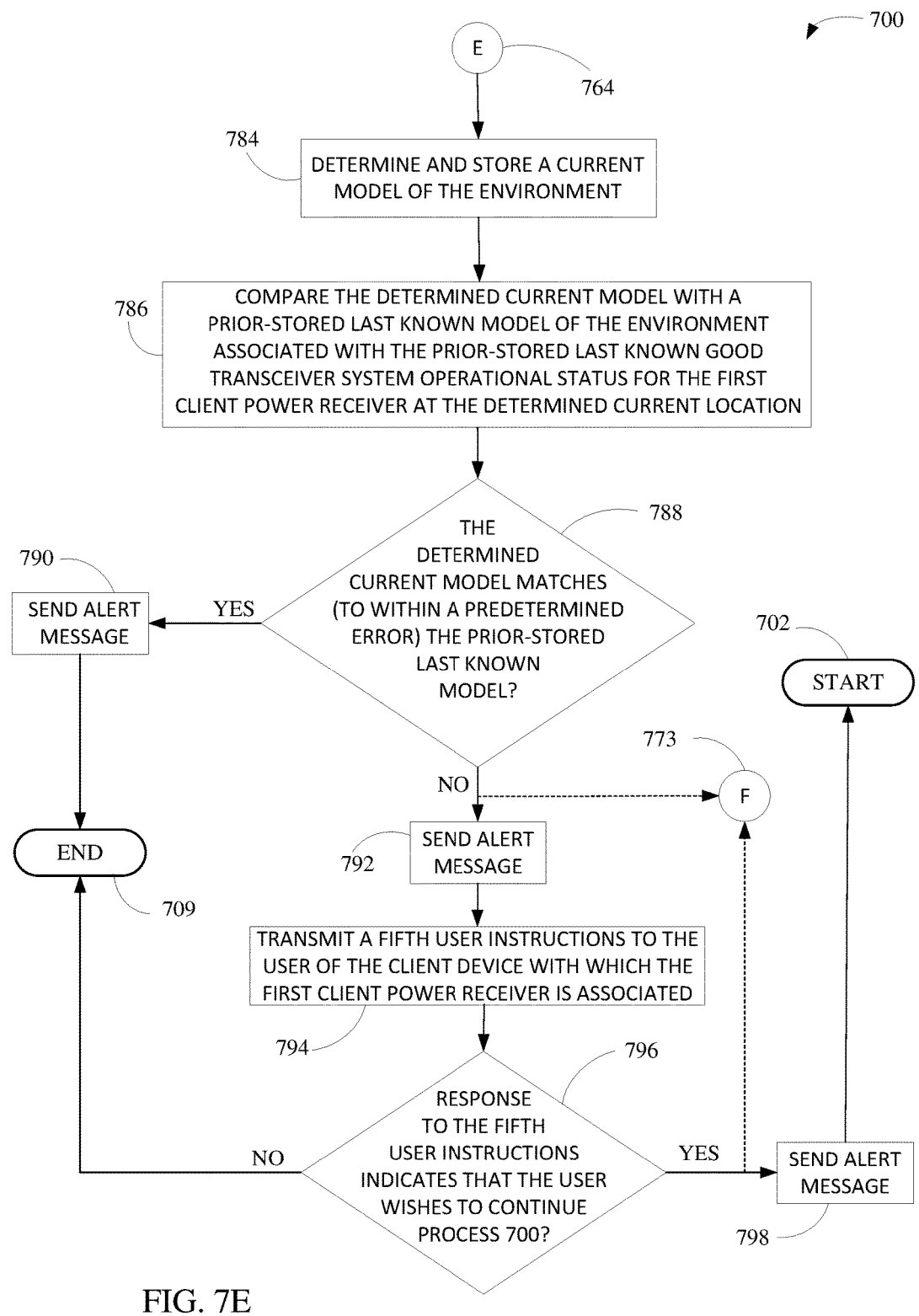

FIG. 7E illustrates a continuation of process 700 from the fifth transition 764. Thus, for an affirmative result from the ninth binary branch 762 (shown in FIG. 7D), process 700 proceeds to a step 784. During step 784, processor 502 and/or remote processor server 506 processor determines (e.g., using 3D scanner array 509 of transceiver system 101) a current model of environment 100 (e.g., a current 3D model of a room in a home or place of business of user 510). Also, during step 784, the determined current model of environment 100 is stored in memory 504 and/or remote processor server 506 memory. Following step 784, process 700 proceeds to a step 786. During step 786, processor 502 and/or remote processor server 506 processor compares the determined current model of environment 100 with a prior-stored last known model of the environment 100. The comparison performed in during step 784 makes use of the prior-stored last known model of the environment 100 that is associated with the prior-stored last known good transceiver system 101 operational status for the first client power receiver 103 at the step 714-determined current location.

Following step 784, process 700 proceeds to an twelfth binary branch 788 during which processor 502 and/or remote processor server 506 processor determines if the step 784-determined current model of environment 100 matches (e.g., to within a predetermined error threshold) the prior-stored last known model. If an affirmative result is obtained from the twelfth binary branch 788, process 700 proceeds to a step 790. During step 790, processor 502 and/or remote processor server 506 processor transmits, via antenna array 104 and/or network 518, an alert message to user 510 and/or a system administrator to convey information indicating the affirmative result of twelfth binary branch 788 in human readable form (e.g., "transceiver system in basement is functioning normally at this time—please call technical support if you experience if you have any questions"). In the example embodiment, process 700 proceeds to end state 709 after step 790. In other embodiments, step 790 is not performed in process 700 and the end state 709 is entered directly in the event of an affirmative result for twelfth binary branch 788.

If, however, during the twelfth binary branch 788, it is determined that the step 784-determined current model of environment 100 does not match the prior-stored last known model, instead of proceeding to step 790 and/or end state 709, process 700 instead proceeds to a step 792. During step 792, processor 502 and/or remote processor server 506 processor transmits, via antenna array 104 and/or network 518, an alert message to user 510 and/or a system administrator to convey information indicating the negative result of the twelfth binary branch 788 in human readable form (e.g., "the system-determined change in the model of your living room requires additional steps to be performed—if you wish to continue with these additional required steps, please promptly and accurately respond to the forthcoming additional user instructions"). In other embodiments, process 700 proceeds to, either instead of in addition to step 792, sixth transition 773 ("F") and performs process 800, as shown and described with reference to FIGS. 8A and 8B.

After step 792 is performed, process 700 proceeds to a step 794 during which processor 502 and/or remote processor server 506 processor transmits, via antenna array 104 and/or network 518, a fifth user instructions to user 510 of a client device 102 with which the first client power receiver 103 is associated. In the example embodiment, fifth user instructions convey to user 510 a request for him or her to respond (e.g., by a text message or email reply within a predetermined time frame after receiving fifth user instructions) indicating his or her desire to continue with the additional required steps of process 700. In some embodiments, the fifth user instructions are transmitted to, either instead of or in addition to, other computing and/or communications devices of user 510 such as via a call to a landline phone and an email to be read on an internet-connected personal computer. In still other embodiments, fifth user instructions are communicated verbally by a system administrator or customer service representative (including a technical support representative) to user 510 after being received in human readable form through, for example, network 518.

After step 794 is performed, process 700 proceeds to a thirteenth binary branch 796 during which processor 502 and/or remote processor server 506 processor determines whether or not the user 510 response to fifth user instructions indicates that the user 510 wishes to continue with the additional required steps of process 700. If a result of thirteenth binary branch 796 is negative, then process 700 proceeds from thirteenth binary branch 796 to the end state 709. In some embodiments, process 700 executes sub-process 736 instead of directly entering end state 709 from thirteenth binary branch 796, and determines if pertinent operational parameters are indicative of acceptable conditions in transceiver system 101 to permit further troubleshoot operations including, without limitation, via a technical support representative contemporaneously interacting with transceiver system 101 and/or remote processor server 506 via a remote network 518 connection mediated by processor 502 and/or remote processor server 506 processor through network interface device 508. In still other embodiments, process 700 proceeds to, either instead of in addition to sub-process 736 and/or end state 709, sixth transition 773 ("F") and performs process 800, as shown and described with reference to FIGS. 8A and 8B.

However, if an affirmative result is obtained during execution of thirteenth binary branch 796, process 700 instead proceeds to a step 798. During step 798, processor 502 and/or remote processor server 506 processor transmits, via antenna array 104 and/or network 518, an alert message to user 510 and/or a system administrator to convey information indicating the affirmative result of the thirteenth binary branch 796 in human readable form (e.g., "due to the system determined change in the model of your living room, the system process will be restarted—please promptly and accurately respond to the forthcoming additional user instructions"). In the example embodiment, process 700 proceeds to start state 702 after step 798. In other embodiments, step 798 is not performed in process 700 and the start state 702 is entered directly in the event of an affirmative result for thirteenth binary branch 796. In still other embodiments, process 700 executes sub-process 736 either instead of or in addition to step 798, and determines if pertinent operational parameters are indicative of acceptable conditions in transceiver system 101 to permit process 700 to enter start state 702. If acceptable conditions are not present, then process 700 may instead enter end state 709 at this time and further alert message(s) and/or user instructions may be transmitted to user 510 and/or a system administrator to facilitate further appropriate troubleshoot operations. In yet other embodiments, process 700 proceeds to, either instead of in addition to step 798 and/or start state 702, sixth transition 773 ("F") and performs process 800, as shown and described with reference to FIGS. 8A and 8B.

Figure 8A:
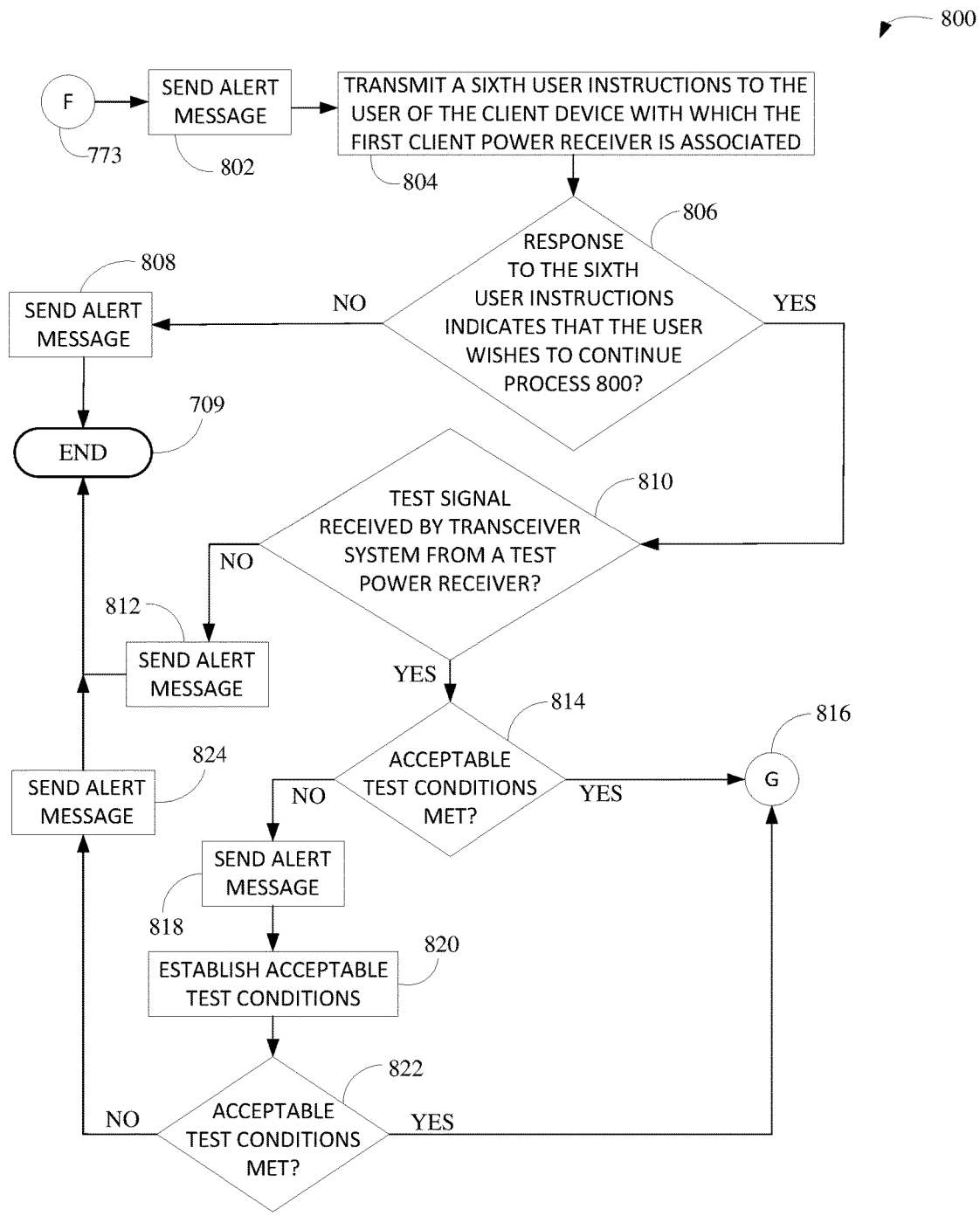
FIGS. 8A and 8B are data flow diagrams illustrating an example process for distinguishing between operational statuses of a transceiver system and a client power receiver in a wireless signal transmission environment, according to some embodiments.
Figure 8B:
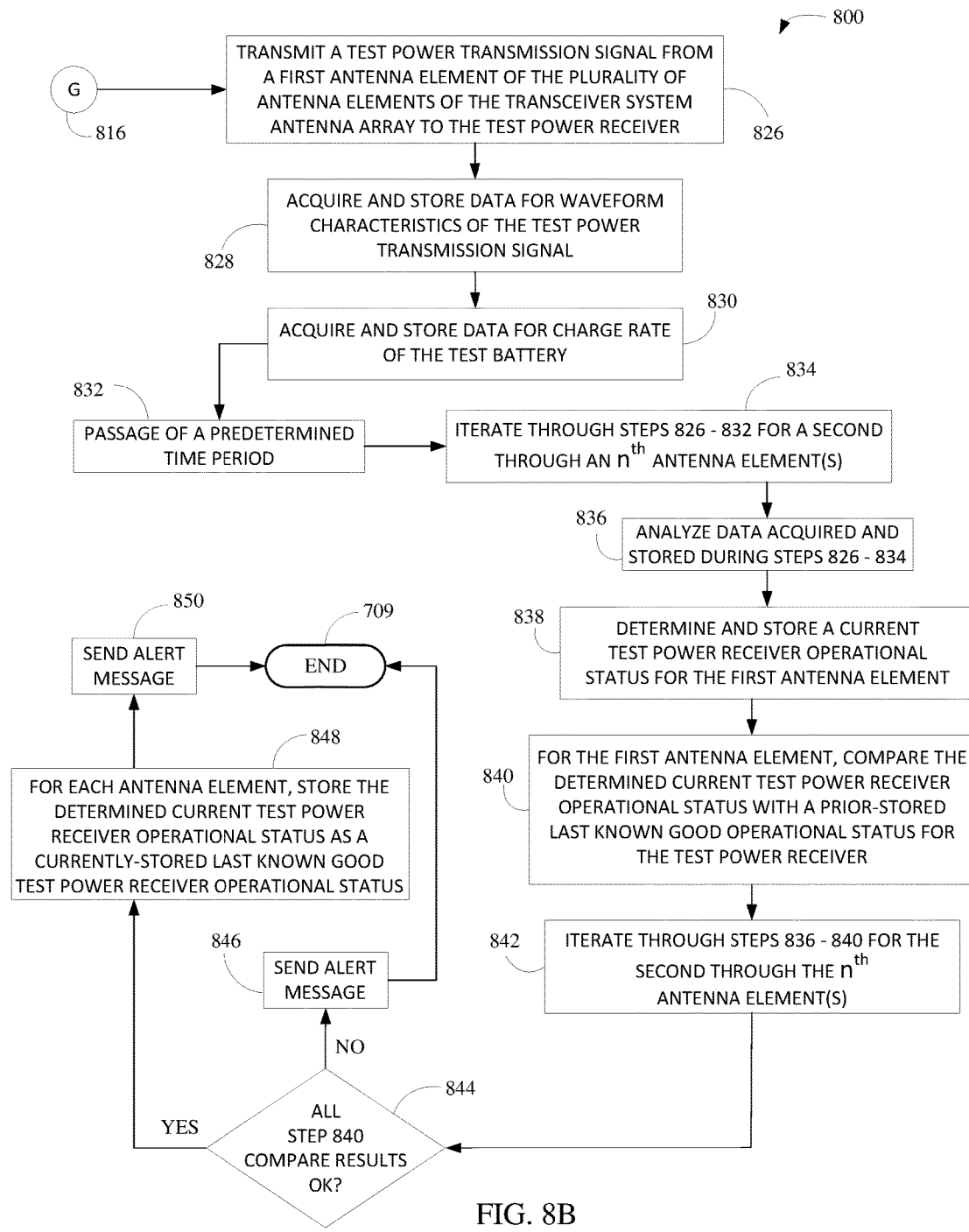

FIGS. 8A and 8B are data flow diagrams illustrating an example process 800 for distinguishing between operational statuses of a transceiver system (e.g., transceiver system 101) and a client power receiver (e.g., client power receiver 103) in a wireless signal transmission environment (e.g., environment 100) in accordance with an embodiment. Referring to FIG. 8A, process 800 is begun from sixth transition 773 and first performs a step 802. During step 802, at least one of processor 502, remote processor server 506 processor, and test controller 401 transmits (e.g., via antenna array 104, network 518, and/or one or more of first 408, second 416, and third 420 antennas) an alert message to user 510 and/or a system administrator. The alert message transmitted in step 802 conveys information indicating that transceiver system 101 and test device 110 will perform a test to facilitate determining and/or identifying if one or more suspected operational problems the user 510 is experiencing are due to either a functional problem in the transceiver system 101 of a functional problem in the first client power receiver 103, or both. In other embodiments, step 802 is not performed in process 800 and a step 804 is performed directly from sixth transition 773.

During step 804, at least one of processor 502, remote processor server 506 processor, and test controller 401 transmits (e.g., via antenna array 104, network 518, and/or one or more of first 408, second 416, and third 420 antennas), a sixth user instructions to user 510 of the client device 102 with which the first client power receiver 103 is associated. In the example embodiment, sixth user instructions convey to user 510 a request for him or her to respond indicating whether or not he or she wishes to continue with process 800, to standby during the test, and to await further instructions. In some embodiments, the sixth user instructions are transmitted to, either instead of or in addition to, other computing and/or communications devices of user 510 such as via a call to a landline phone and an email to be read on an internet-connected personal computer. In still other embodiments, sixth user instructions are communicated verbally by a system administrator or customer service representative (including a technical support representative) to user 510 after being received in human readable form through, for example, network 518.

After step 804 is performed, process 800 proceeds to a fourteenth binary branch 806 during which at least one of processor 502, remote processor server 506 processor, and test controller 401 determines whether or not the user 510 response to sixth user instructions indicates that the user 510 wishes to continue with process 800. If a result of fourteenth binary branch 806 is negative, then process 700 proceeds from fourteenth binary branch 806 to a step 808. During step 808, at least one of processor 502, remote processor server 506 processor, and test controller 401 transmits (e.g., via antenna array 104, network 518, and/or one or more of first 408, second 416, and third 420 antennas) an alert message to user 510 and/or a system administrator. The alert message transmitted in step 808 conveys information indicating the negative result of fourteenth binary branch 806 and that process 800 is being aborted (e.g., "system process aborted—please recommence this process at a later time and/or contact technical support with any questions"). Following step 808, process 800 proceeds to the end state 709. In other embodiments, a negative result from fourteenth binary branch 806 causes process 800 to proceed from step 808 to at least one prior step in process 700 (shown in FIGS. 7A-7E), including one or more process 700 steps that are predetermined and/or specified by user 510 and/or the system administrator. In still other embodiments, step 808 is not performed in process 800 and process 800 instead proceeds directly to the one or more process 700 steps or to the end state 709.

If, however, an affirmative result is obtained from fourteenth binary branch 806, process 800 proceeds from fourteenth binary branch 806 to a fifteenth binary branch 810 instead of proceeding to step 808. During fifteenth binary branch 810, at least one of processor 502 and/or remote processor server 506 processor determines whether or not a test signal (e.g., test beacon signal 424) is received by at the antenna array 104 of transceiver system 101 from the test power receiver 112. If the test beacon signal 424 is not received during fifteenth binary branch 810, process 800 proceeds from fifteenth binary branch 810 to a step 812. During step 812, at least one of processor 502, remote processor server 506 processor, and test controller 401 transmits (e.g., via antenna array 104, network 518, and/or one or more of first 408, second 416, and third 420 antennas) an alert message to user 510 and/or a system administrator. The alert message transmitted in step 812 conveys information indicating the negative result of fifteenth binary branch 810 and that process 800 is being aborted (e.g., "system process aborted—please recommence this process at a later time and/or contact technical support with any questions"). Following step 812, process 800 proceeds to the end state 709. In other embodiments, a negative result from fifteenth binary branch 810 causes process 800 to proceed from step 812 to at least one prior step in process 700 (shown in FIGS. 7A-7E), including one or more process 700 steps that are predetermined and/or specified by user 510 and/or the system administrator. In still other embodiments, step 812 is not performed in process 800 and process 800 instead proceeds directly to the one or more process 700 steps or to the end state 709.

If, however, the test beacon signal 424 is received during fifteenth binary branch 810, process 800 proceeds from fifteenth binary branch 810 to a sixteenth binary branch 814. During sixteenth binary branch 814, at least one of processor 502, remote processor server 506 processor, and test controller 401 determines whether or not acceptable test conditions are met with respect to test power receiver 112. Acceptable test conditions determined during sixteenth binary branch 814 include, for example and without limitation, determining (e.g., through receipt by antenna array 104 of encoded information in the test data signal 427) that the test battery 404 SOC is at a predetermined and substantially constant state of charge (SOC) that is less than the full charge state, that there is an absence of any error messages indicating any functional problems present in test device 110 and/or test power receiver 112, and charge rate instrument 421 is ready to measure charge rate of the test battery 404 and transmit this data to test controller 401 for analysis.

If acceptable test conditions are met during sixteenth binary branch 814, process 800 proceeds from sixteenth binary branch 814 to a seventh transition 816 ("G"), as shown and described with reference to FIG. 8B. If, however, a negative result is obtaining during the sixteenth binary branch 814, process 800 proceeds from sixteenth binary branch 814 to a step 818. During step 818, at least one of processor 502, remote processor server 506 processor, and test controller 401 transmits (e.g., via antenna array 104, network 518, and/or one or more of first 408, second 416, and third 420 antennas) an alert message to user 510 and/or a system administrator. The alert message transmitted in step 818 conveys information indicating the negative result of sixteenth binary branch 814 and that process 800 is proceeding to attempt to establish the acceptable test conditions (e.g., "system waiting to establish acceptable test conditions—please standby"). Following step 818, process 800 proceeds to a step 820, during which at least one of processor 502, remote processor server 506 processor, and test controller 401 implements processes to establish the acceptable test conditions.

After at least attempting (e.g., for a predetermining number of times and/or a predetermined time period) to establish the acceptable test conditions during step 820, process 800 proceeds to a seventeenth binary branch 822. During seventeenth binary branch 822, at least one of processor 502, remote processor server 506 processor, and test controller 401 determines whether or not acceptable test conditions are met for test power receiver 112, substantially as described above with respect to sixteenth binary branch 814. If acceptable test conditions are met during seventeenth binary branch 822, process 800 proceeds from seventeenth binary branch 822 to the seventh transition 816, as shown and described with reference to FIG. 8B. If, however, a negative result is obtaining during seventeenth binary branch 822, process 800 proceeds from seventeenth binary branch 822 to a step 824. During step 824, at least one of processor 502, remote processor server 506 processor, and test controller 401 transmits (e.g., via antenna array 104, network 518, and/or one or more of first 408, second 416, and third 420 antennas) an alert message to user 510 and/or a system administrator. The alert message transmitted in step 824 conveys information indicating the negative result of seventeenth binary branch 822 and that process 800 is being aborted (e.g., "system test process aborted—please recommence this process at a later time and/or contact technical support with any questions"). Following step 824, process 800 proceeds to the end state 709. In other embodiments, a negative result from seventeenth binary branch 822 causes process 800 to proceed from step 824 to at least one prior step in process 700 (shown in FIGS. 7A-7E), including one or more process 700 steps that are predetermined and/or specified by user 510 and/or the system administrator. In still other embodiments, step 824 is not performed in process 800 and process 800 instead proceeds directly to the one or more process 700 steps or to the end state 709.

FIG. 8B illustrates a continuation of process 800 from the seventh transition 816. Thus, after an affirmative result in seventeenth binary branch 822 (shown in FIG. 8A), process 800 proceeds to a step 826. In a first iteration of step 826, processor 502 and/or remote processor server 506 processor directs transmission of test power transmission signal 422 from a first antenna element 501 of the plurality of antenna elements 501 of transceiver system 101 antenna array 104 to the test power receiver 112. After step 826, process 800 proceeds to a step 828 during which test power receiver 112 acquires (e.g., using at least one of test controller 401 and remote processor server 506 processor) and stores (in test storage media 403 and/or a remote processor server 506 memory) data values for waveform characteristics of the test power transmission signal 422 received from the first antenna element 501 of transceiver system 101 antenna array 104. After step 828, process 800 proceeds to a step 830 during which test power receiver 112 acquires (e.g., from the charge rate instrument 421 using at least one of test controller 401 and remote processor server 506 processor) and stores (in test storage media 403 and/or a remote processor server 506 memory) data for charge rate of the test battery 404.

After completing step 830, process 800 proceeds to a step 832 during which test controller 401 and/or remote processor server 506 processor counts (e.g., using one or more processor clocks) and allows a predetermined time period to elapse. Step 830 thereby provides process 800 adequate time for the acquisition and storage of the data values for waveform characteristics of the test power transmission signal 422 and data for the charge rate of the test battery 404. For instance, in the example embodiment, test power transmission signal 422 is transmitted from first antenna element 501 to test power receiver 112 as a series of bursts over a set amount of time. Thus, the amount of time passing in step 832 is at least as long as the predetermined set amount of time during which test power transmission signal 422 bursts are to be transmitted by the first element 501. Following steps 826 to 832, process 800 proceeds to a step 834. In the example embodiment, and other than the first antenna element 501, the plurality of elements 501 of antenna array 104 is referred to in FIG. 8B as a second element 501 through an n-th element 501, where the n-th element 501 is the last of the plurality of elements 501 (including the first and second elements 501) that are used by the transceiver system 101 for transmitting test power transmission signal 422 to test power receiver 112.

During step 834, process 800 iterates through steps 826 to 832 for the second and the n-th element(s) 501 of antenna array 104. After completing the step 834 iteration(s) for the n-th antenna element 501, process 800 proceeds to a step 838 during which at least one of test power receiver 112, transceiver system 101, and remote processor server 506 analyzes (e.g., using at least one of test controller 401, processor 502, and remote processor server 506 processor, respectively) the data values for waveform characteristics of the test power transmission signal 422 and the data for the charge rate of the test battery 404 acquired and stored during steps 826 to 834. Following step 838, process 800 proceeds to a step 840 during which at least one of test controller 401, processor 502, and remote processor server 506 processor determines and stores (e.g., in at least one of test storage media 403, memory 504, and remote processor server 506 memory) a current test power receiver 112 operational status for the first antenna element 501. The determination performed in step 838 is based, at least in part, on the step 836 analysis of the data values for waveform characteristics of the test power transmission signal 422 and the data for the charge rate of the test battery 404. After completing step 838, process 800 proceeds to a step 840. During step 840, at least one of test controller 401, processor 502 and/or remote processor server 506 processor compares the determined current test power receiver 112 operational status for the first antenna element 501 with a prior-stored last known good operational status for the test power receiver 112.

After a first iteration of steps 836 to 840, process 800 proceeds to a step 842. During step 842, process 800 iterates through steps 836 to 840 for the second through the n-th element(s) 501 of antenna array 104. After completing the step 842 iteration(s) for the n-th antenna element 501, process 800 proceeds to a eighteenth binary branch 844. During the eighteenth binary branch 844, at least one of test controller 401, processor 502 and/or remote processor server 506 processor determines if, for the first through the n-th antenna elements 501, and for all iterations of step 840, the determined current test power receiver 112 operational status matches (e.g., based on the result of the comparison of step 840 and based on predetermined performance criteria including, without limitation, a predetermined error threshold) the prior-stored last known good test power receiver 112 operational status. If, during eighteenth binary branch 844, it is determined that the current and prior-stored last known good operational statuses for the test power receiver 112 do not match to within the predetermined error threshold, process 800 proceeds from eighteenth binary branch 844 a step 846. During step 846, at least one of test controller 401, processor 502 and/or remote processor server 506 processor transmits (e.g., via antenna array 104, network 518, and/or one or more of first 408, second 416, and third 420 antennas), an alert message to user 510 and/or a system administrator to convey information indicating the negative result of eighteenth binary branch 844 in human readable form and that process 800 is being aborted (e.g., "system process aborted due to test device not functioning as expected—please contact technical support at your earliest convenience"). Following step 846, process 800 proceeds to the end state 709. In other embodiments, a negative result from eighteenth binary branch 844 causes process 800 to proceed from step 846 to at least one prior step in process 700 (shown in FIGS. 7A-7E), including one or more process 700 steps that are predetermined and/or specified by user 510 and/or the system administrator. In still other embodiments, step 846 is not performed in process 800 and process 800 instead proceeds directly to the one or more process 700 steps or to the end state 709.

If, however, an affirmative result is obtained during eighteenth binary branch 844, process 800 instead proceeds from eighteenth binary branch 844 to a step 848. During step 848, at least one of test controller 401, processor 502 and/or remote processor server 506 processor stores (e.g., in at least one of test storage media 403, memory 504, and remote processor server 506 memory) the determined current test power receiver 112 operational status as a currently-stored last known good test power receiver 112 operational status. Process 800 then proceeds from step 848 to a step 850 during which at least one of test controller 401, processor 502 and/or remote processor server 506 processor transmits (e.g., via antenna array 104, network 518, and/or one or more of first 408, second 416, and third 420 antennas), an alert message to user 510 and/or a system administrator to convey information indicating the affirmative result of eighteenth binary branch 844 in human readable form, and including, without limitation, that the process 800 test of test device 110 and test power receiver 112 was successful (e.g., "system test successful and the transceiver system and test device in your master bedroom are functioning normally at this time—please call technical support if you experience if you have any questions").

Following step 850, process 800 proceeds to the end state 709. In other embodiments, process 800 to proceed from step 848 to at least one prior step in process 700 (shown in FIGS. 7A-7E), including one or more process 700 steps that are predetermined and/or specified by user 510 and/or the system administrator. In still other embodiments, step 848 is not performed in process 800 and process 800 instead proceeds directly to the one or more process 700 steps or to the end state 709. Further, in the example embodiment where process 800 is executed after process 700 enters the sixth transition 773 due to transceiver system 101 experiencing at least a suspected or tentative functional problem during operation in environment 100, by performing a test of each element 501 of at least a subset of the plurality of elements 501 of antenna array 104 in direct LOS with test power receiver 112, process 800 therefore provides user 510 and/or a system administrator the ability to distinguish between functional issues related to transceiver system 101 and those related to client power receiver 103 and/or client device 102.

FIG. 9 is a diagram illustrating an example timeline indicating phases of the techniques described herein for determining operational status of components (e.g., transceiver system 101, client power receiver 103, and/or client device 102) of a wireless signal transmission environment (e.g., environment 100). In some embodiments, the processor (e.g., at least one of test controller 401, processor 502 and/or remote processor server 506 processor) and the memory (e.g., at least one of test storage media 403, memory 504, and remote processor server 506 memory) form at least a part of a learning system that implements learning algorithms from processor-executable program instructions stored on non-transitory computer-readable storage media (including at least portions of aspects of the memory devices described herein).

For example, and without limitation, the remote processor server 506 processor can provide supervised learning (e.g., machine learning systems and algorithms) which can leverage classification algorithms to identify patterns, determine expected behaviors, and facilitate detecting anomalous and uncharacteristic events related to operational statuses of the components of the wireless signal transmission environment 100 (e.g., e.g., transceiver system 101, client power receiver 103, and/or client device 102). Such machine learning systems included in the embodiments of the systems and methods described herein can be trained with more data and refined of results to for example, provide increasingly accurate and useful diagnostic and troubleshooting information to user 510 and/or a system administrator, thereby allowing more prompt and less costly solutions to resolve any functional problems which may arise during operation. In addition, processors such as remote processor server 506 processor can provide unsupervised learning leverage clustering algorithms to identify patterns, trends in data, etc., including to facilitate predicting occurrence of functional problems and enabling preventive maintenance that interferes minimally with the user 510 requirements for operation.

As illustrated in FIG. 9, operation of system processor(s) such as remote processor server 506 processor can be divided into two phases: a learning (or training) phase 902 and a tracking and updating phase 904. The learning phase begins at an initial time point (denoted t0 in FIG. 9). During the learning phase 902, the transceiver system 101 in conjunction with processor(s) (e.g., at least one of test controller 401, processor 502 and/or remote processor server 506 processor) takes various actions and performs various analyses as described above. The period of time spanning t0 to t1 necessary for the learning phase 902 can vary depending on factors such as the complexity of the environment 100 (e.g., the shape and contents of the room), the number of transceiver systems 101, the number of client power receivers 103 transmitting beacon signals 324. Also, for example, the frequency of movement of non-static objects can have an impact on the time that is required to generate an initial 3D model of environment 100. By the end of the learning phase 902, the processors have stored in memory sufficient amounts of data for the 3D model and for the at least one waveform characteristic of beacon signals 324 received from respective client power receivers 103 at one or more locations in the environment 100 in order to determine patterns and to predict characteristics of changes to those data values with changes in, for example, relative positions of the respective client power receivers 103 relative to the transceiver system 101.

During the tracking and updating phase 904, locations of client power receivers 103 are tracked through the environment 100 and a responsive behavior of the transceiver system 101 (e.g., to dynamically synthesize and direct the radiation pattern to varying locations of client power receiver 103 in the environment 100) is implemented with ever increasing speed and effectiveness (e.g., to wirelessly charge battery 304. Also, during the tracking and updating phase 904, processors such as processor 502 of the transceiver system 101 can determine deviations from expected waveform characteristics of beacon signals 324 received from client power receivers 103 in the environment 100. For example, and without limitation, determining that an expected waveform phase pattern for a particular client power receiver 103 beacon signal 324 is modified as compared to an expected characteristic value for the client power receiver 103 at a specific location or location zone in environment 100 may prompt the initiation of diagnostic and/or troubleshooting processes, as described herein. The results of such processes are stored in memory as data including operational statuses for the transceiver system 101 for the particular client power receiver 103 at the respective location(s) in the environment 100 and therefore, the tracking and updating phase 904 provides additional information for continual learning of the system.

Over time, as the tracking and updating phase 904 continues after beginning at time t1, algorithms that are stored as program instructions in one or more non-transitory computer-readable storage media become more efficient at implementing the methods described herein. For example, during the learning phase 902, the algorithms rely on data acquisition and analysis, and thus may be said to be "data-aided." Upon transitioning into the tracking and updating phase 904, the algorithms are able to employ heuristic techniques relying on expected model behaviors of the components of the environment 100. Thus, in the tracking and updating phase, the algorithms may be said to be "non-data-aided."

Figure 10:
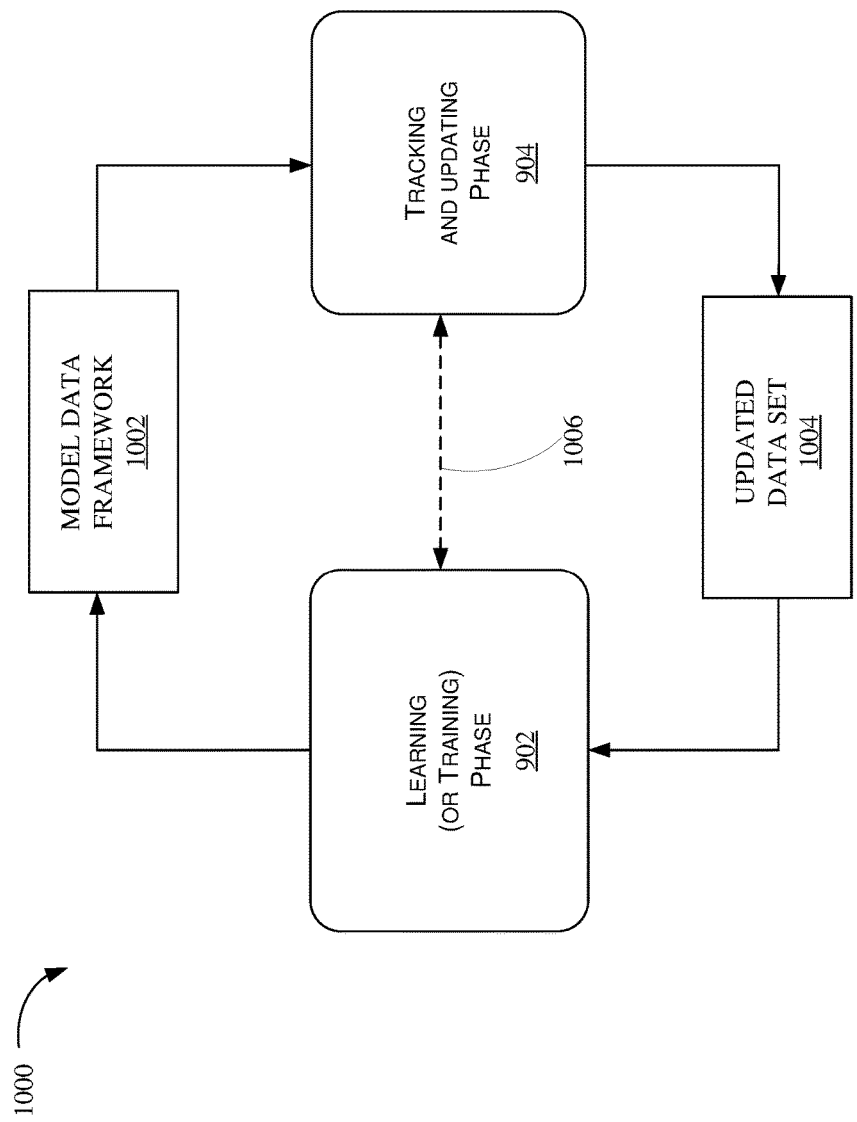
FIG. 10 illustrates a heuristic self-organization scheme for data flow by and between the learning and the updating and tracking phases, according to some embodiments.

FIG. 10 illustrates a heuristic self-organization scheme 1000 for data flow by and between the learning 902 and the updating and tracking phases 904 shown and described above with respect to FIG. 9. Data acquired and analyzed by the processors (e.g., at least one of test controller 401, processor 502 and/or remote processor server 506 processor) and stored in the memory (e.g., at least one of test storage media 403, memory 504, and remote processor server 506 memory) during the learning phase 902 is used to generate a predictive framework that models behaviors of components present in the wireless signal transmission environment 100. This framework includes a 3D spatial model of environment 100 along with the expected waveform characteristics (e.g., phases, magnitudes, directions, angles of arrivals, etc.) of beacon signal 324 waveforms received at elements 501 of antenna array 104. As described above, these data are further classified by location in the environment 100 for each of the client power receivers 103 present in the environment 100 such that during the tracking and updating phase 904, deviations from expected waveform characteristics are determinable for system diagnostic and troubleshooting purposes. Thus, a model data framework 1002 is used by the tracking and updating phase 904 to implement predictive heuristic processes that are not entirely reliant on de novo analysis of data acquired from the environment 100.

During operation of transceiver system 101 in the tracking and updating phase 904, various changes in the environment 100 may occur that require additional machine learning to implement the functionality as described herein. For example, one or more additional client power receivers 103 may become present in the environment 100 and transmit beacon signal(s) 324 to the antenna array 104. Also, for example, physical characteristics of the 3D space of environment 100 may change such as movement of furniture and/or additional people entering and occupying a room. Such changes in the environment 100 are determinable during the tracking and updating phase 904 as described above. These changes require re-entry into the learning phase 902, but with respect to those aspects of components like client power receivers 103 in environment 100 that did not experience changes, the tracking and updating phase 904 continues. Thus, an updated data set 1004 is used by the learning phase 902 to analyze the new data and generate the additional information for the model data framework 1002 for use by the tracking and updating phase 904.

Furthermore, through a data link 1006, the learning 902 and the tracking and updating 904 phases each have access to the other's data and models at any time during operation of the transceiver system 101. Information sharing in this manner enables heuristic and diagnostic-related determinations that make use of models of the environment 100 and the wireless signal transmission components therein without relying on new data acquisition and analysis, thus speeding up operations and implementations of corrective actions. For example, in a dynamic environment 100 where both familiar (e.g., pre-existing) client power receivers 103 are in motion, the waveform characteristics that are expected will follow patterns, and deviations from those patterns will prompt the processors to implement additional learning and modeling algorithms. Likewise, where no change is observed during the tracking and updating phase 904 where a change would be expected (e.g., a new beacon signal 324 is received by the antenna array 104 of the transceiver system 101), additional processes are implemented including those described herein to assist in diagnostics and troubleshooting actions for the system. These actions rely on assumptions drawn from the learned model, rather than on data that is acquired and analyzed for the purpose of such diagnosis. Over time, heuristic self-organization scheme 1000 provides continual revisions to the predictive model, and the system becomes ever more "trained" to perform the techniques described herein with ever-increasing speed and accuracy for the benefit of the user 510.

Figure 11:
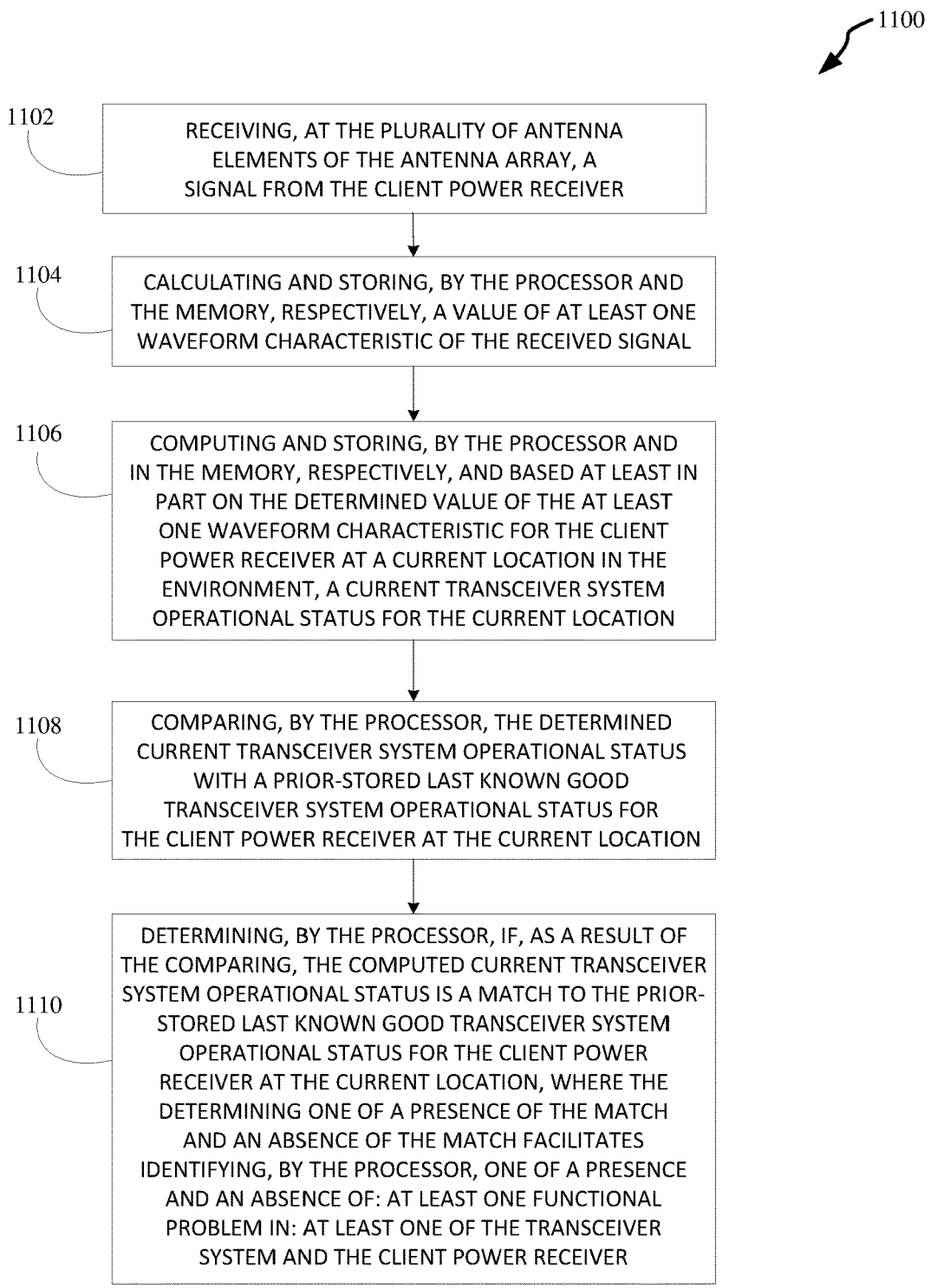
FIG. 11 is a flow diagram illustrating an example method for determining operational status of components of a wireless signal transmission environment, according to some embodiments.

FIG. 11 is a flow diagram illustrating an example method 1100 for determining operational status of components (e.g., transceiver system 101, client power receiver 103, and/or client device 102) of a wireless signal transmission environment (e.g., environment 100). In the example embodiment, method 1100 includes a step 1102 during which at least one antenna element 501 of the plurality of elements 501 of the antenna array 104 receives a signal (e.g., beacon signal 324) from client power receiver 103. Following step 1102, method 1100 performs a step 1104, during which the processor (e.g., at least one of test controller 401, processor 502 and/or remote processor server 506 processor) calculates and the memory (e.g., at least one of test storage media 403, memory 504, and remote processor server 506 memory) stores, a data value of at least one waveform characteristic of the received signal. After step 1104, method 1100 executes a step 1106 and computes and stores, by the processor and the memory, respectively, and based at least in part on the determined data value of the at least one waveform characteristic for client power receiver 103 at a current location in the environment, a current transceiver system 101 operational status for the current location.

Method 1100 then proceeds from step 1106 to a step 1108 to compare, by the processor, the determined current transceiver system operational status with a prior-stored last known good transceiver system 101 operational status for the client power receiver 103 at the current location. Lastly, in the example embodiment, method 1100 performs a step 1110 after step 1108. During step 1110, method 1100 determines, by the processor, whether or not, as a result of the comparing of step 1108, the step 1106-computed current transceiver system 101 operational status is a match to the prior-stored last known good transceiver system 101 operational status for the client power receiver 103 at the current location. In step 1110 of method 1100, determining one of a presence of the match and an absence of the match facilitates identifying, by the processor, one of a presence and an absence of: at least one functional problem in: at least one of the transceiver system 101 and the client power receiver 103.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the processor-readable medium or processor-readable storage medium is shown in an exemplary embodiment to be a single medium, the terms "processor-readable medium" and "processor-readable storage medium" should be taken to include a single medium or multiple media (e.g., a centralized or distributed database, and/or associated caches and servers) that store the one or more sets of program instructions. The term "processor-readable medium" and "processor-readable storage medium" shall also be taken to include any medium that is capable of storing, encoding or carrying a set of instructions for execution by the processor and computer system to that cause those and associated devices and systems to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations or combinations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶16 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method of determining operational status of components of a wireless signal transmission environment, the method comprising:
   determining, by a transceiver system, a value of at least one waveform characteristic of a signal received at multiple antennas of the transceiver system,
      wherein the signal is initiated by a client power receiver at a first location in the wireless signal transmission environment;
   computing based at least in part on the value of the at least one waveform characteristic, a transceiver system operational status for the client power receiver at the first location;
   comparing the transceiver system operational status for the client power receiver at the first location with a prior-stored last known transceiver system operational status for the client power receiver at a the first location; and
   identifying, based on the comparison, at least one functional problem in at least one of the transceiver system and the client power receiver.

2. The method of claim 1, further comprising:
   determining the first location of the client power receiver in the environment based, at least in part, on the value of the at least one waveform characteristic.

3. The method of claim 1, further comprising:
   storing the transceiver system operational status for the client power receiver at the first location as a last known transceiver system operational status for the client power receiver at the first location.

4. The method of claim 1 further comprising:
   notifying a user of the least one functional problem.

5. The method of claim 1, further comprising:
   transmitting instructions to a user of at least one of the transceiver system and the client power receiver,
      wherein the instructions indicate at least one troubleshooting-related action for the user to perform in the environment.

6. The method of claim 1, further comprising:
   identifying a model of the environment based at least in part on data representative of a physical layout of the environment; and
   comparing the model of the environment with a prior-stored last known model of the environment associated with the prior-stored last known transceiver system operational status for the client power receiver at the first location;
   wherein identifying the at least one functional problem is further based on the model comparison.

7. The method of claim 6, further comprising:
   determining based at least in part on the model comparison, a change in a position of at least one line-of site (LOS) obstructive object in the model relative to the prior-stored last known model; and
   ascertaining, based at least in part on one or more of: the value of the at least one waveform characteristic, the first location, and the determined change in the position, if the at least one LOS obstructive object is at least partially obscuring a LOS between the client power receiver and at least one antenna of the multiple antennas of the transceiver system,
   wherein identifying the at least one functional problem is further based on whether at least one LOS obstructive object is at least partially obscuring a LOS between the client power receiver and at least one antenna of the multiple antennas of the transceiver.

8. The method of claim 7, further comprising:
transmitting a message to a user of at least one of: the transceiver system and the client power receiver,
wherein the message is operable to instruct the user to at least one of:
verify the determined change in the position,
verify whether or not the ascertained at least partial obscuration of the LOS is an actual obscuration of the LOS in the environment, and
place the client power receiver in a new position that is fully in LOS with the at least one element; and
receiving a response to the message from the user;
wherein identifying the at least one function problem is further based on the response.

9. The method of claim 1, further comprising:
performing, for at least one repetition after a first instance and at predetermined intervals of time over a period of time beginning at the first instance: the determining, the computing, the comparing, and the identifying,
wherein the performing facilitates tracking a plurality of historical operational statuses for the transceiver system, and
wherein the tracking further facilitating the identifying the at least one functional problem.

10. The method of claim 1, further comprising:
performing, at least one iteration of: the determining, the computing, the comparing, and the identifying, for each element of at least a subset of the plurality of antennas,
wherein the performing further facilitates the identifying the at least one functional problem.

11. A transceiver system comprising:
an adaptively-phased antenna array having multiple radio-frequency (RF) transceivers;
control circuitry operably coupled with the adaptively-phased antenna, the control circuitry configured to:
determine a value of at least one waveform characteristic of a signal received at the multiple RF antennas of the transceiver system, wherein the signal is initiated by a client power receiver at a first location in the wireless signal transmission environment;
compute, based at least in part on the value of the at least one waveform characteristic, a transceiver system operational status for the client power receiver at the first location;
compare the transceiver system operational status for the client power receiver at the first location with a prior-stored last known transceiver system operational status for the client power receiver at the first location; and
identify, based on the comparison, at least one functional problem in at least one of the transceiver system and the client power receiver.

12. The transceiver system of claim 11, wherein the control circuitry is further configured to:
identify the first location of the client power receiver in the environment based, at least in part, on the value of the at least one waveform characteristic.

13. The transceiver system of claim 11, wherein the control circuitry is further configured to:
store the transceiver system operational status for the client power receiver at the first location as a last known transceiver system operational status for the client power receiver at the first location.

14. The transceiver system of claim 11, wherein the control circuitry is further configured to:
notify a user of the least one functional problem.

15. The transceiver system of claim 11, wherein the control circuitry is further configured to further comprising:
direct one or more of the multiple antennas to transmit instructions to a user of at least one of the transceiver system and the client power receiver,
wherein the instructions indicate at least one troubleshooting-related action for the user to perform in the environment.

16. The transceiver system of claim 11, further comprising: a three-dimensional (3D) array scanner.

17. The transceiver system of claim 16, wherein the 3D array scanner is configured to:
identify a model of the environment based at least in part on data representative of a physical layout of the environment; and
compare the model of the environment with a prior-stored last known model of the environment associated with the prior-stored last known transceiver system operational status for the client power receiver at the first location;
wherein the control circuitry is further configured to use the model comparison to identify the at least one functional problem.

18. The transceiver system of claim 17, wherein the control circuitry is further configured to further comprising:
determine, based at least in part on the model comparison, a change in a position of at least one line-of site (LOS) obstructive object in the model relative to the prior-stored last known model; and
ascertain, based at least in part on one or more of: the value of the at least one waveform characteristic, the first location, and the determined change in the position, if the at least one LOS obstructive object is at least partially obscuring a LOS between the client power receiver and at least one antenna of the multiple RF antennas of the transceiver system.

19. An apparatus comprising:
one or more computer readable storage media; and
program instructions stored on the one or more computer readable storage media, wherein the program instructions, when executed by one or more processing systems of a transceiver system, direct the transceiver system to:
determine a value of at least one waveform characteristic of a signal received at the multiple RF antennas of the transceiver system, wherein the signal is initiated by a client power receiver at a first location in the wireless signal transmission environment;
compute, based at least in part on the value of the at least one waveform characteristic, a transceiver system operational status for the client power receiver at the first location;
compare the transceiver system operational status for the client power receiver at the first location with a prior-stored last known transceiver system operational status for the client power receiver at the first location; and
identify, based on the comparison, at least one functional problem in at least one of the transceiver system and the client power receiver.

20. The apparatus of claim 19, wherein the program instructions, when executed by one or more processing systems of a transceiver system, further direct the transceiver system to:
identify a model of the environment based at least in part on data representative of a physical layout of the environment; and comparing the model of the environment with a prior-stored last known model of the environment associated with the prior-stored last known transceiver system operational status for the client power receiver at the first location;
wherein the control circuitry is further configured to use the model comparison to identify the at least one functional problem.

* * * * *

UNITED STATES PATENT AND TRADEMARK OFFICE
CERTIFICATE OF CORRECTION

PATENT NO. : 10,257,731 B2
APPLICATION NO. : 15/948111
DATED : April 9, 2019
INVENTOR(S) : Hatem Ibrahim Zeine et al.

Page 1 of 1

It is certified that error appears in the above-identified patent and that said Letters Patent is hereby corrected as shown below:

In the Specification

Column 45, Line 34, delete "¶16" and insert --¶6--

Signed and Sealed this
Twelfth Day of November, 2019

Andrei Iancu
*Director of the United States Patent and Trademark Office*